(12) United States Patent
Ibrahim et al.

(10) Patent No.: US 9,435,654 B2
(45) Date of Patent: Sep. 6, 2016

(54) SYSTEM AND METHOD FOR CREATING, STORING, AND UPDATING LOCAL DYNAMIC MAP DATABASE WITH SAFETY ATTRIBUTE

(71) Applicants: Faroog Ibrahim, Dearborn Heights, MI (US); Katta Vidya Sagar, Bangalore (IN)

(72) Inventors: Faroog Ibrahim, Dearborn Heights, MI (US); Katta Vidya Sagar, Bangalore (IN)

(73) Assignee: Savari, Inc., Santa Clara, CA (US)

( * ) Notice: Subject to any disclaimer, the term of this patent is extended or adjusted under 35 U.S.C. 154(b) by 216 days.

(21) Appl. No.: 14/163,478

(22) Filed: Jan. 24, 2014

(65) Prior Publication Data
US 2014/0358414 A1 Dec. 4, 2014

Related U.S. Application Data

(63) Continuation-in-part of application No. 14/047,157, filed on Oct. 7, 2013, now Pat. No. 9,037,404, which is a continuation-in-part of application No. 13/907,862, filed on Jun. 1, 2013, now Pat. No. 8,892,347, and a continuation-in-part of application No. 13/907,864, filed on Jun. 1, 2013, now Pat. No. 9,261,601.

(51) Int. Cl.
| | |
|---|---|
| *G01C 21/26* | (2006.01) |
| *G01C 21/30* | (2006.01) |
| *G01C 21/32* | (2006.01) |
| *G08G 1/01* | (2006.01) |
| *G01C 21/10* | (2006.01) |
| *G01C 21/36* | (2006.01) |
| *G08G 1/0967* | (2006.01) |
| *G06F 17/30* | (2006.01) |

(52) U.S. Cl.
CPC .............. *G01C 21/32* (2013.01); *G01C 21/10* (2013.01); *G01C 21/26* (2013.01); *G08G 1/0112* (2013.01); *G08G 1/0129* (2013.01); *G08G 1/0141* (2013.01); *B60W 2550/402* (2013.01); *G01C 21/367* (2013.01); *G06F 17/30241* (2013.01); *G08G 1/096791* (2013.01)

(58) Field of Classification Search
None
See application file for complete search history.

(56) References Cited

U.S. PATENT DOCUMENTS

| | | | | |
|---|---|---|---|---|
| 2006/0224811 A1* | 10/2006 | Sichner et al. | ............... | 710/306 |
| 2007/0088490 A1* | 4/2007 | Sutardja | ........................ | 701/117 |
| 2008/0114530 A1* | 5/2008 | Petrisor et al. | ............... | 701/117 |
| 2009/0072998 A1* | 3/2009 | Yanase | ........................ | 340/905 |
| 2011/0098922 A1* | 4/2011 | Ibrahim | ........................ | 701/208 |

(Continued)

*Primary Examiner* — Fadey Jabr
*Assistant Examiner* — Kevin P Mahne
(74) *Attorney, Agent, or Firm* — Maxvalveip LLC

(57) ABSTRACT

DSRC (Dedicated short range communication) is expected to play a significant role in Transportation applications for Public Safety and Traffic Management. Some of the key applications especially safety and mobility application requires an accurate representation of the road segments. Accordingly, here, in one example, we describe a method and infrastructure for DSRC V2X (vehicle to infrastructure plus vehicle) system. This presentation, e.g., adds the following improvements on the existing technologies, as some of the examples: (a) Using Speed-Profiles for identifying Intersections/mandatory-stops/Speed-limits, etc. Also, the extension of the map coverage using speed profile data. (b) Vehicular density identification for determining confidence of generated MAP. (c) Mechanisms for identifying Lane Attributes, like Lane-Width, Lane-Connections, Possible Movement states, average travel-time on the lane, etc. In this presentation, we provide various methods and systems to manage and update such maps and its corresponding information, plus many variations on those.

4 Claims, 40 Drawing Sheets

(56) References Cited

U.S. PATENT DOCUMENTS

2011/0109475 A1* 5/2011 Basnayake et al. .......... 340/902
2013/0162449 A1* 6/2013 Ginsberg ...................... 340/910
2013/0325344 A1* 12/2013 Yester .......................... 701/533
2014/0188376 A1* 7/2014 Gordon ........................ 701/118

* cited by examiner

SYSTEM AND METHOD FOR CREATING, STORING, AND UPDATING LOCAL DYNAMIC MAP DATABASE WITH SAFETY ATTRIBUTE

RELATED APPLICATIONS

This application is a CIP of co-pending another US utility application, namely, Ser. No. 14/047,157, titled "System and method for map matching", filed Oct. 7, 2013 which in turn is a CIP of two other co-pending US utility applications, namely, Ser. No. 13/907,864, titled "System and method for lane boundary estimation and host vehicle position and orientation", filed Jun. 1, 2013, and Ser. No. 13/907,862, titled "System and method for node adaptive filtering and congestion control for safety and mobility applications toward automated vehicles system", filed Jun. 1, 2013. It is also related to another US patent application filed on about the same day, with docket number Savari-4, with the same inventors and assignee, titled "System and method for road side equipment of interest selection for active safety applications". The teachings of all the above applications are incorporated herein, by reference. The current application claims the priority date of the above applications.

BACKGROUND OF THE INVENTION

One aspect of the present invention relates to a system that uses the Vehicle to Vehicle (V2V) and/or the Vehicle to infrastructure communication for safety and mobility applications. The invention provides methods and systems to make the V2X realized and effectively used in any intelligent transportation system toward automated vehicle system. Dedicated Short Range Communication (DSRC) is the main enabling technology for connected vehicle applications that will reduce vehicle crashes through fully connected transportation system with integrated wireless devices and road infrastructure.

The integration between the current production crash avoidance systems, V2X technology, and other transportation infrastructure (as taught in our system) paves the way for realizing automated vehicles system. The safety, health, and cost of accidents (on both humans and properties) are major concerns for all citizens, local and Federal governments, cities, insurance companies (both for vehicles and humans), health organizations, and the Congress (especially due to the budget cuts, in every level). People inherently make a lot of mistakes during driving (and cause accidents), due to the lack of sleep, various distractions, talking to others in the vehicle, fast driving, long driving, heavy traffic, rain, snow, fog, ice, or too much drinking. If we can make the driving more automated by implementing different scale of safety applications and even controlling the motion of the vehicle for longer period of driving, that saves many lives and potentially billions of dollars each year, in US and other countries. We introduce here an automated vehicle infrastructure and control systems and methods. That is the category of which the current invention is under, where V2X communication technology is vital component of such system, with all the embodiments presented here and in the divisional cases, in this family.

DSRC (Dedicated short range communication) is expected to play a significant role in Transportation applications for Public Safety and Traffic Management. Some of the key applications especially safety and mobility application requires an accurate representation of the road segments. For better and accurate results in these Applications, One would be requiring location MAPs. An example set of these applications is the safety related ones on intersections. Given the number of signalized intersections in United States (around 0.3 Million) and many more across the globe, the required number of MAPs required are very high, and thus, very hard to manage. Lane level maps are required for most of these applications which is currently not available. Even if these maps will be available on some scale in the future, they will be more of a Static nature, and would require frequent updates both for temporary and permanent changes in these MAPs. As this very approach of updating is time consuming, and given the number of MAPs and the frequency of changes, creating and maintaining these MAPs would be a real challenge.

The solution discussed in this invention, as one embodiment, addresses this very challenge of Creating and Maintaining MAPs for V2X applications. The invention method uses the data exchange between DSRC (or equivalent technology) on board unit (OBU) in the vehicle and DSRC (or equivalent technology) road side equipment (RSE) in the infrastructure, to communicate the data of interest, required to build the map database. The RSE receives vehicle dynamic data measured and transmitted by the OBU, processes it, creates the map, stores the map, and updates the map using the methods explained in the following sections. The presented method also takes advantage of the traffic controller data (when available), such as signal phase to create the supported correlation between sensed vehicles' movements and the status of the traffic controller signal data.

Some of the prior art in this area are (foreign patents): EP2486556A1, CN102016507A, and CN101210825B. However, none of the prior art teaches the features shown in this current disclosure, as detailed below. In this disclosure, we show some advantages for our method, for example:

Consider Dynamic Map Versus Static Map:

Using Dynamic MAPs for V2X applications provides numerous benefits over Static MAPs. Listed below are some of these advantages, for example:

- The speed with which the changes in environment are determined and reflected in the MAP message would be far quicker than those of any other methods.
- Dynamic MAPs enable V2X applications to provide more accurate results, compared to Static MAPs.
- The method drastically reduces the number of manual intervention for MAP maintenance (Dynamic MAP) to bare minimal (or none).
- As the V2X applications are going to use the very GPS data collected by the vehicles, a MAP based on these collected data would give better results, compared to MAPs generated by other means.

SUMMARY OF THE INVENTION

This disclosure, e.g., adds the following improvements on the existing technologies, as some of the embodiments:

a. Using Speed-Profiles for identifying Intersections/mandatory-stops/Speed-limits, etc. Also, the extension of the map coverage using speed profile data.
b. Vehicular density identification for determining confidence of generated MAP.
c. Mechanisms for identifying Lane Attributes, like Lane-Width, Lane-Connections, Possible Movement states, average travel-time on the lane, etc.
d. Mechanisms for integrating Traffic Controller data into MAPs (Identifying Traffic Signal Phases, and subsequently generating SPAT messages).

e. Method of identifying temporary and permanent changes in the map and their update mechanism.

f. Method of identifying an obstacle of mobility attribute in the map database (for example, an idle vehicle).

In this disclosure, we provide various methods and systems to manage and update such maps and its corresponding information.

DETAILED DESCRIPTION OF THE PREFERRED EMBODIMENTS

Figure 1:
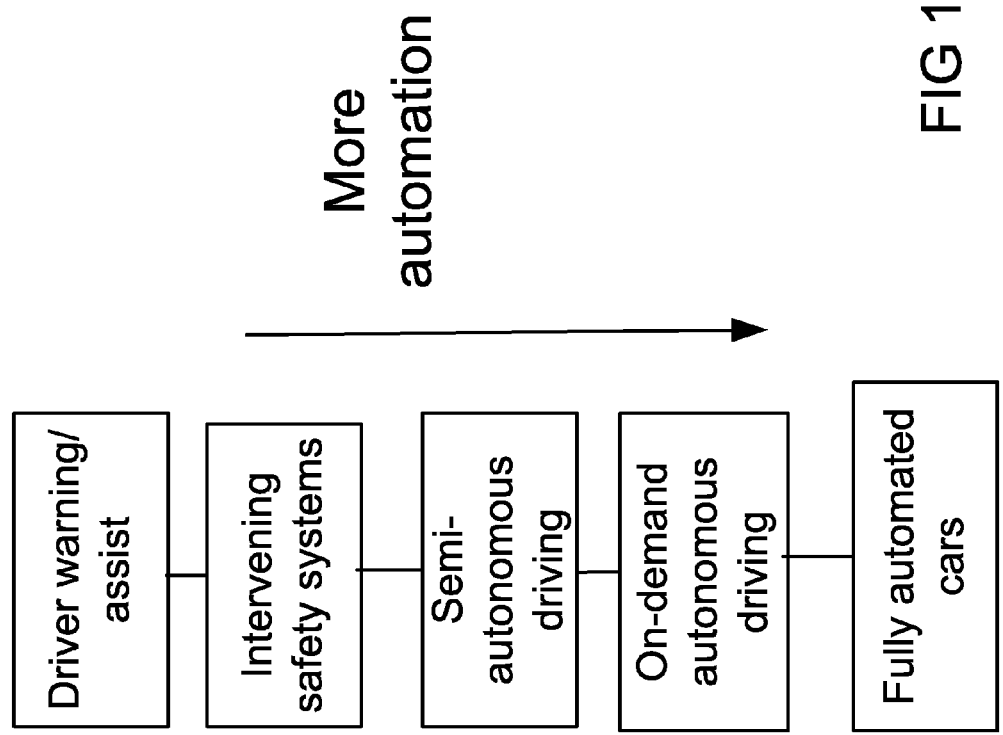
FIG. 1 is for one embodiment, as an example, for representation of development of fully automated vehicles, in stages.

Here, we describe some of the embodiments of our system and method:

Let's look at the details of one method:

MAP Generation: MAP Generation based on vehicle data, included in Basic Safety Message (BSM) or equivalent message(s).

a. Listen to all the BSMs transmitted in the given region, and based on what is the intended region of map, filter out the BSM data which falls outside this region. The intended region of map can also be defined adaptively, using the speed profiles data in each road segment of interest. For example, a high average speed road segment will require more map coverage than a low average speed road segment.

i. For example, for fixed regions, the regions are defined beforehand based on historical data or best guess or estimates or averages for size of regions.

ii. For example, for adaptive regions, one can use the ranges of sizes for regions from historical data. Or, one can use a base line for size of region and scale that, using an expansion factor. The original region can be a region between some streets or city blocks, or a square or a circle, or overlap between a square and city blocks or overlap between a circle and city blocks, or a combination of the above. In one embodiment, the expansion factor is defined as proportional to speed of the vehicle or average speeds or median speed of all vehicles, with respect to a base velocity $V_0$, as typical velocity value. So, for example, if for slow velocity, say e.g. 25 km/h, or $V_0$, the region is defined as 0.5 km×0.5 km square, or square of side length $L_0$, then for velocity of 50 km/h, or $V_1$, which is double the original slow velocity, the linear size grow by a factor of 2, as well, or the new region with the size of 1 km×1 km, or square of side length $L_1$, adaptively expanded. So, for this example, we have:

$$L_1 = L_0(V_1/V_0)$$

i.e., linear scaled square on each side.

iii. For example, for non-linear relationship for expansion factor, we can have:

$$L_1 = L_0(V_1/V_0)^{1/m}$$

Where m is an integer, more than 1, e.g., m=3.

iv. For example, for m=2, for above formulation, we have:

$$L_1 = L_0(V_1/V_0)^{1/2}$$

Or $$L_1^2 = L_0^2(V_1/V_0)$$

Which means that the area of square linearly grows with the velocity, i.e.:

$$A_1 = A_0(V_1/V_0)$$

Where $A_1$ and $A_0$ denote areas for squares defined by $L_1$ and $L_0$, respectively.

v. For another example, for non-linear relationship for expansion factor, we can have:

$$L_1 = L_0(V_1/V_0)^m$$

Where m is an integer or real number, more than 1, e.g., m=3.

vi. For an example, for overlap situation, between a circle and city blocks, the center of circle is set at the current vehicle position, and all the streets will be included in that circle of radius R.

vii. For an example, for overlap situation, between a circle and city blocks, R can increase proportional to velocity V, or in any power form of $V^m$, or $V^{(1/m)}$, where m is an integer or real number, bigger than 1. Or, it can be based on or relative to a base velocity $V_0$, e.g., for slow moving vehicle case.

viii. For an example, for any area or location outside the defined area, the data is ignored or discarded, or alternatively, assigned a very low weight, to suppress their importance or effect, e.g. as 0.1 or 10 percent, compared to weight 1.

b. Store location (concise), Heading, Speed, and timestamp of each of the BSM.

If the vehicle provides PH (Path History or trajectory or breadcrumb trail points) (concise points), check the accuracy/confidence of the PH points. In case the accuracy is good (say better than e.g. 0.4m (or meter)), store them instead of actual locations reported by the vehicle.

For example, from the current location and velocity, we can calculate the next point in time, or we can extrapolate the next point, based on the last N points. For example, one can assume a line or higher order curves, or polynomials of degree M, to fit the points in the formula and get the coefficients. Once the coefficients are known, the next point can be extrapolated.

For example, the accuracy can be measured from the distance of a given point to the line or curve of trajectory.

For an embodiment, the accuracy threshold is a fixed number or distance.

For an embodiment, the accuracy threshold is a variable number or distance. That can be dependent on the velocity of the vehicle. For example, the higher the velocity, the higher the threshold, e.g., with a linear relationship.

Otherwise, use the location details provided by the vehicle and generate the PH (Concise) points for the vehicle, and store these values.

c. Start generating a Temporary Map, once the stored data has sufficient number of vehicles, Q (say, e.g., 1000 vehicles), or for example, length of time for monitoring, T, as a threshold, e.g., one-week worth of data, to make sure we have enough data points for our analysis and determination. In one embodiment, we can use any logical combination of thresholds or conditions on Q and T, e.g., using AND or OR.

Here are the steps of one embodiment of our method: (see FIG. 27)

Step 1: Generating Lanes: (see FIGS. 18-19)

Assign equal weights for all the paths at the start, as the initialization step.

Combine the Paths (or parts of paths) which have a separation distance of lesser than a fraction of a lane width, say, e.g., ¼th of the Lane width, or e.g., 0.5 meter, as the threshold for this step, to indicate that those are in fact the same. The weight of the resultant path is calculated using the combined statistic method similar to the one used in Kalman filtering.

e.g., Resultant Weight: $(w_r) = 1/\text{sqrt}[((1/w1)^2 * (1/w2)^2)/((1/w1)^2 + (1/w2)^2)]$ Where sqrt is the square root function, w1 is the weight of the first path, and w2 is the weight of the second path.

Another method is to use the first order statistical combination.

Then, we have:

$$w\_r = 1/(((1/w1)*(1/w2))/((1/w1)+(1/w2)))$$

In general, we have as a function (F) of w1 and w2:

$$w\_r = F(w1, w2)$$

First, combine the paths which start and end with the same heading angles.

Second, combine the parts of paths of the vehicles which have the same headings in that part.

For the combined paths which are headed in the same direction, update the weights (using the above formula) of the paths (or parts of the paths).

Detect Lane changes in the captured/stored data, and discard that data (either part or full info from that vehicle). Different methods of detecting lane changes have been proposed in previous inventions (see the parent applications). Any of those methods can be used here for the detection of lane changes.

In addition, the statistical Median operation can be also used to filter outliers in positions and paths. It also can help for the lane change detection.

In one embodiment, generally, the outliers may be bad data points, and cannot be relied on. So, we filter them out. In one embodiment, assuming the normal distribution, if any data point is beyond 2 standard deviations, from the peak, it is considered as the outlier point, and gets discarded.

In one embodiment, a vehicle is monitored from its center, as a point, for tracking purposes.

In one embodiment, a vehicle is monitored from the middle front point and the middle back point, as 2 points, for tracking purposes. So, for example, if one point (e.g. the front point) is in one lane and the other point is in another lane, that may indicate transition between lanes or changing lanes, if the difference is above a threshold, which is measured with respect to the distance perpendicular to the lane direction, or with respect to the angle relative to the lane direction.

Step 2: Determining Intersection Region and Splitting the Lanes: (See FIGS. 20-23)

Intersection Diamond region can be identified from the above data in the following ways: (see FIG. 28)
1. Using Speed profiles of the vehicles.
2. Using Heading angles of the vehicles.
3. Using Intersection of Lanes (generated from Vehicle Travel paths).

Now, let's look at different methods in details:

Method 1: Using Speed Profiles of the Vehicles: (See FIGS. 20-22)

For each of the lanes, consider the stop location of all the vehicles traversing on that lane.

Of these locations, discard the locations where the vehicle stays for lesser than a short time period $t_1$, say e.g. 5 sec. (As these could have been recorded due to vehicle slow motion, and would not have the time for GPS stabilization. So, they should be discarded.)

Of all these locations, using statistical methods, e.g. using standard-deviation method, neglect the outliers (e.g. 5% outliers), or e.g., discard the tail of the probability distribution on either side, as e.g., extreme cases or unreliable cases.

Consider vehicle travel direction on the road (based on locations and timestamps), and pick up the location which comes farthest and toward the exiting end of the lane, as $P_{far}$.

Pick up all the locations which lay within distance $L_2$ of $P_{far}$, say e.g. within 7 m of the selected location, or $A_3$. Calculate the percentage of vehicles in this circle or region. If the percentage of vehicles in this circle or region is below $S_1$, say e.g. 7% of the total vehicle locations on this lane, then discard the selected location and reconsider above step for selecting a location.

If Vehicle lengths are known, use them, as $L_3$, else use $L_{default}$, e.g. 5 m, as typical length, and then calculate the average of vehicle lengths. (We can eliminate this step and use 5 m, directly, if required, or if not enough data is available from the vehicles.)

Construct average of locations based on average of GPS location of all vehicles which fall within area $A_3$, or the 7m radius of the selected location.

Calculate the GPS location of the point which falls ahead of the above average-of-locations, at a distance of a fraction of the typical vehicle length, or $S_2$, e.g. half (or 55 percent) of average vehicle length.

The GPS location of each of the lanes, constructed based on the above steps, provides the outer edge of the Intersection Diamond region.

This applies on other road segment of interest, that show queue of vehicles stopped, with profile history of coming to stop. Another way to look at it is to detect an area where there is no stopped vehicle position density. (This is the intersection diamond region.)

Method 2: Using Heading Angles:

Consider all the vehicles which are traversing on each of the lanes.

Of the vehicles traversing on each lane, select the vehicles which have executed a change in the Heading angle (by more than $\alpha_1$, e.g. 20°), where some of the other vehicles near to that location were traveling straight.

Of all the above selected vehicles, select the location where they executed this change.

Of all these locations, discard the outliers which fall outside of e.g. 5% of the statistical limit, or tail of the distribution curve, as anomalies or outliers.

Calculate the average of these remaining locations. This average location provides the lane boundary of the selected lane.

In one embodiment, the average is based on average of X and Y coordinates, on 2-D coordinates.

In one embodiment, the average is based on weighted average of X and Y coordinates, emphasizing some data over the others. For example, one can have more weights for more reliable data.

The GPS location of each of the lanes, constructed based on the above steps, provides the outer edge of the Intersection Diamond region.

Method 3: Using Intersection of Lanes (Generated from Vehicle Travel paths): (see FIG. 23)

For each of the lanes which differ in heading angle by more than angle $\alpha_3$, say e.g. 30°, construct the Intersection point of the lines (lanes).

In one embodiment, angle $\alpha_3$ can be adjusted based on historical data, as a threshold value.

In one embodiment, angle $\alpha_3$ can be randomly selected from the range of 25° to 35°.

Construct a convex polygon using these points (or a subset of them) which can cover all the points.

In one embodiment, for a subset of points, choose every other point.

In one embodiment, for a subset of points, choose one point out of every 3 points.

In one embodiment, for a subset of points, choose one point out of every N points. (N is an integer above 3.)
In one embodiment, to define a convex polygon using these points, we look at the current side and 2 previous sides of the polygon, labeled $P_1$, $P_2$, and $P_3$, respectively, as vectors. The difference between the directions of vectors ($P_1$ and $P_2$) and ($P_2$ and $P_3$) are angles $\alpha_4$ and $\alpha_5$, respectively. If both angles $\alpha_4$ and $\alpha_5$ are in the same directions (e.g. both tilted clockwise, with respect to the previous vector), then the resulting polygon is a convex one.

Expand the Convex polygon by adding a certain amount of width, e.g. a fraction ($g_1$) of the lane width (say e.g. half of the lane width) on each of the sides.

Split the lanes, based on the intersection region polygon.

Step 3: Determining Lane Type (Ingress/Egress): (See FIG. 24)

We use the following methods:

Method 1: Using Difference in Angle in Vehicle Heading and Lane-Heading (Waypoint0):

For each of the lanes, calculate the angle of Waypoint0 (w.r.t. Waypoint1).

Calculate the difference in heading of Waypoint0 and Heading of vehicle ($\alpha_6$).

If the Difference $\alpha_6$ falls between say, e.g., {[0°-90°] U [270°-360°]}, as the union of sets or ranges of angles (or the angle locating in the union of the first and fourth quadrants in the 2-D coordinate system), then given lane is an Egress lane, else (otherwise), it is an Ingress lane.

Based on the vehicles heading angle at the 1st waypoint (closest to intersection region), we decide on whether the Lane is an Ingress or Egress.

Method 2: Based on Vehicle Movement Inside the Lane:

Using the location of vehicle and its corresponding timestamp, determine whether Vehicle is approaching Waypoint0, or leaving.

Step 4: Determining Approach Set for Each of the Lanes: (See FIG. 25)

Combine the (incoming/outgoing) lanes which fall on one side of the polygon and have either same (or) exactly opposite heading angle (diff. approximately 180°).

Step 5: Determining Connected Lanes: (See FIG. 26)

For each of the Ingress lanes, observe the movement (mapping of incoming lanes to outgoing lanes) of each of the vehicles in that lane.

Create a Mapping list for the selected Ingress lane, and count the vehicles traversing each of these connections.

Discard the outliers (connections) where the vehicles traverse less than e.g. 5% of the total vehicles in that lane.

Using relative heading angle between the Ingress lane and Connecting-Egress lane ($\alpha_7$), determine whether a Left/Right/Straight (L/R/S) maneuver is required to enter the connecting-Egress lane.

In one embodiment, we compare the angle $\alpha_7$ with a threshold angle $\alpha_8$. If absolute value of $\alpha_7$ is smaller than or equal to $\alpha_8$, then we call it Straight. If absolute value of $\alpha_7$ is bigger than $\alpha_8$, then, e.g.:
For positive $\alpha_7$ values, we call it Right.
For negative $\alpha_7$ values, we call it Left.

Step 6: Determining Movement States for Each Ingress Lane:

For each of the Ingress lanes, based on the Connected-Egress lane's Maneuver code, determine the Movement state. Say, for example, the possible connection maneuvers are Left-Turn (LT), Straight (S), and then the Movement states are: LT movement, S movement.

Figure 40:
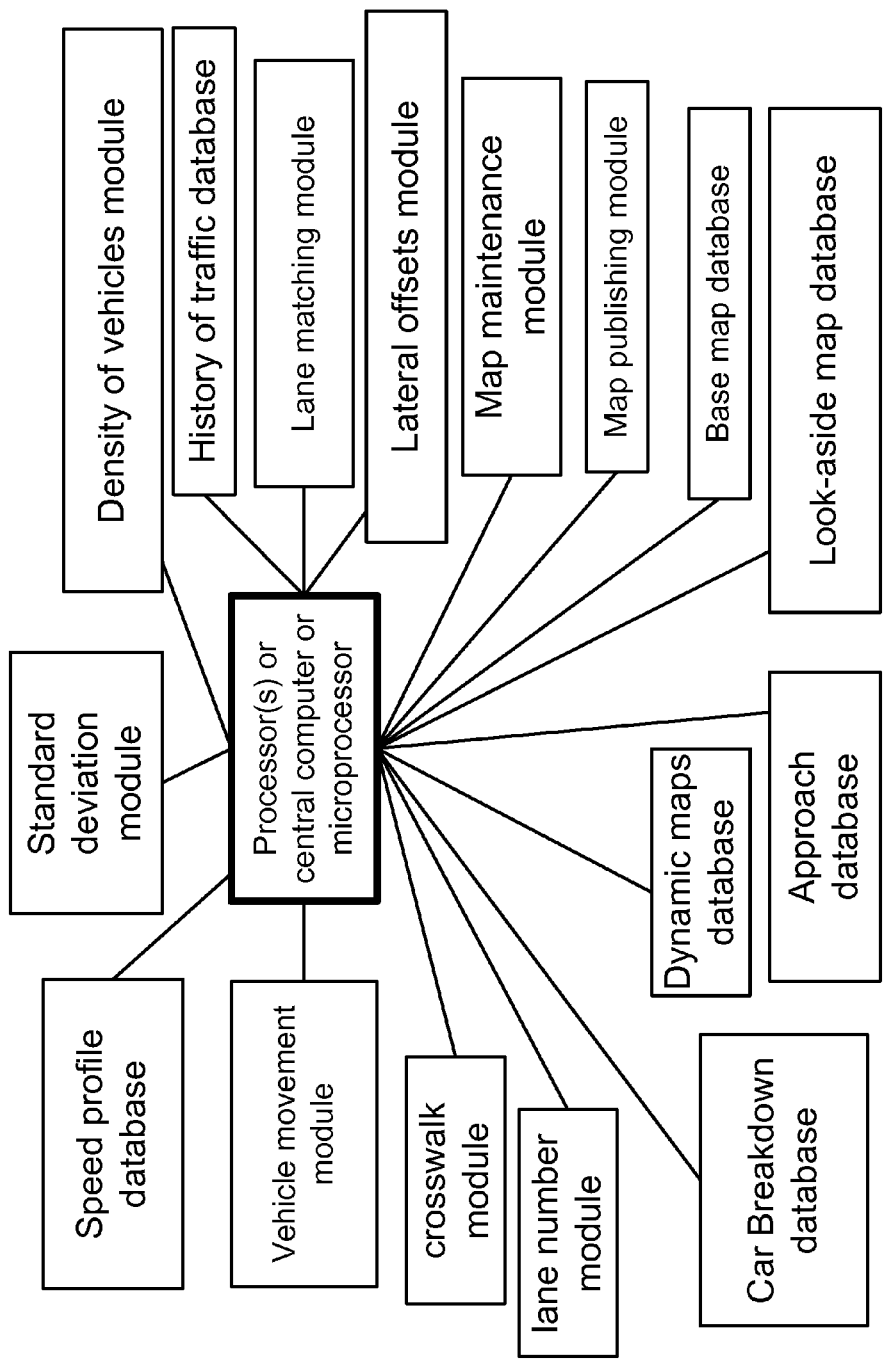
FIG. 40 is for one embodiment of the invention, for a system of creating, storing, and updating local dynamic MAP database with safety attribute.

MAP Generation: Improvement to above described method in steps 1-6 with an additional Signal Data available from Traffic controller. (see FIG. 40)

The Idea in this method is to match Traffic controller's signal-phase data with vehicles' motion in each of the lanes and determine the signal phase for each of the Lane/Approach. Here is how it works:

Continuously poll Traffic-controller for the Signal status information.

When Traffic-controller is stating a particular phase number for the first time, during next short period of time, $t_2$, e.g. 1-5 seconds, identify the lanes in which vehicles started moving from a halt.

Of these lanes, identify the direction of travel of the vehicles in each ingress lane towards their egress lanes, and determine the Phase-number for that lane corresponding to that Movement state.

For each of the Signal-phase mapped to the Ingress lane, count the number of vehicles using that phase to cross the Diamond region, $N_1$.

Eliminate the Outlier, e.g. 5% of the phases (if any), or the tail of the distribution, from the above list of phases for each of the Ingress lanes, resulting in a smaller number ($N_2$).

MAP Maintenance: Based on BSM messages(s) or equivalent vehicle message. (see FIG. 40)

Removal of (or repair work in) a Lane: When the density of the vehicles in a particular lane drops off drastically (e.g., more than a percentage or ratio of the original number, e.g., more than $N_3$ percentage), and adjoining lane increases in a similar manner (e.g., more than a percentage or ratio of the original number, e.g., more than $N_4$ percentage).

A vehicle breakdown is detected in that lane. (Or)

The lane is temporarily closed. (Or)

The lane is permanently closed. (Or)

A detour is assigned for that lane. (Or)

There is an accident in that lane. (Or)

Almost all the vehicles in that lane have been detected to do a lane change to adjacent lane(s) before a certain point (coordinates X, Y in 2D space). (Or)

No vehicles were detected in that lane over a period of time, $t_3$, e.g. 2 hours, while on a similar time frame over a past couple of days, or $N_{past}$ past number of days, we had a greater number of vehicles using that lane, percentage-wise with respect to all vehicles on the road, or using an absolute number, e.g., $N_{abs}$, e.g. 50.

The exception is for holidays and weekends, which have different traffic patterns. So, we do not include them for comparison with weekdays. So, for comparison, we have different classes, e.g.: working day class, weekend class, and holiday class, which correspond to different days and traffic patterns and human behaviors.

For example, during weekends, at 6 am, the lanes may be empty or almost empty, but there is no accident or broken down car in any lane. So, it cannot be compared with a period of rush-hour at 6 am during weekdays/work days. So, each class should be compared within/with itself.

For example, during different seasons, e.g. winter, the ice and snow may slow down the cars. Thus, those days cannot be good base of comparison for a sunny day in Summer. So, they constitute a new class of days with different traffic patterns and behavior. So, they should be compared with similar days with similar situations/classes.

Removal of (or repair work in) an Approach: When, e.g., the density of the vehicles in a particular approach road decreases.

For example, a major pileup (breakdown in multiple/all lanes) has been detected.

For example, the road is closed and a detour is assigned.

No vehicles were detected in that lane over a period of time, while the same time previous days had a considerable number of vehicles passing through that approach.

One can specify the previous number of days, N.

One can specify the number of hours or window of hours, e.g., from 12:00 to 16:00, or from 12 noon to 4 pm, for monitoring the traffic.

One can specify the considerable number of vehicles (as a threshold), or number of cars in general, as the absolute number or ratio of numbers or percentage of total, e.g., 50 cars, or 50 cars/hour, or 5 times more cars than yesterday for the same time period, or 50 percent more cars than yesterday for the same window of time or rush hours, or 1.2 times more cars than 2 hours ago, or 50 more cars than 2 hours ago, or 50 cars/minute more cars than 2 hours ago (as the rate comparison), or 50 percent more cars/minute than 2 hours ago (as the rate comparison), or 1.2 times more cars/minute than 2 hours ago (as the rate comparison).

The season, holidays, weekends, weather-related events, and work days are considered, to define different classes of the days, hours, traffic patterns, or human bahaviors, for comparison purposes, as the base line, or find anomaly, or find road condition, or determine traffic status, or prepare maps, or modify maps.

Historical data can be accumulated for a region or specific road to get the patterns for traffic or behavior, e.g., to predict the future or scale the results or numbers for a specific condition. For example, for rainy days, the speeds are reduced by a factor of 30 percent.

For different roads, one can define different classes, for which the same pattern is observed, or there is a common parameter or property. For example, the 4-lane interstate highways, near a major city, may show a similar traffic pattern or traffic jams, or they may have same general traffic speed. So, we define a class for these highways, which historically or statistically behave similarly, in one or more aspects or parameters. Then, for a given class member, if we get a data for a specific time/day, e.g., for speed of vehicles, and e.g., it shows 20 percent lower speed with respect to 1 hour ago, then one can assume the same for other members of the same class for the same time period, which is useful to estimate the speed for other highways, or make the data analysis faster, even if we have no data or incomplete data from other members of class (other highways of the same class), which probably gives us a reasonable starting point or base line or data point, especially in the absence of data or reliable data from other highways of the same class.

Updating Waypoints of a Lane: When vehicle-Matching is either continuously failing or having a correction values above e.g. 20 cm, or a threshold distance, D. Note that D can be defined based on a fraction of lane width or average car length, or percentage or ratio of those parameters.

Do a Lane-matching for all the vehicles traversing in the Mapped region.

For each of the Lane, calculate the average lateral-offset values each of the vehicles is having in each segment of the Lane.

If the lateral offsets are greater than, $D_w$, e.g. 20 cm, for particular contiguous waypoints, add additional waypoints in between the existing waypoints, based on average location or X-Y 2D coordinates (discarding outliers, e.g. 5 percent outliers, anomalies, or tails of distribution curve) of recent-vehicles traversing in that lane-segment, e.g. recent 15 minutes or 1 hour.

In one embodiment, $D_w$ is defined e.g. based on lane width or average vehicle length or width.

MAP Maintenance: Improvement to above method with additional Signal Data available from Traffic Controller. (see FIG. 40)

Keep a continuous monitor on the Vehicle traversals using each of the Signal phases.

Verify if the existing Matching of the Signal-Phases and the Vehicle motions in each of the active lanes are still valid.

Neglect the outlier in the matching, e.g. the 5 percent extremes, but if the matching provides a consistent "inconsistencies" in the matchings, update the Signal-Phase and Lane-Movement states matching.

MAP Publishing, Storing, and Updating Mechanisms: Broadcasting MAP information. (see FIG. 40)

Each of the RSE/Remote-Server would have 2 MAPS for each location, namely, Base-Map and Look-aside (Current-status) MAP.

Case 1: No Base map is available (initial condition):

For a Look-aside MAP, once the MAP has sufficient number of vehicle (say e.g. 100) traversals on each of its lanes, consider it for further calculations.

Once the above limit is reached, execute a Map-matching of vehicles with Look-aside MAP, and determine the match percentage or ratio. Average the matching percentage for all the vehicles.

If the Match-percentage is high (say e.g. above 99%), upgrade the Look-aside database at that instant to Base-MAP.

Case 2: Base Map is available (updating condition):

Compare the Base Map with Look-aside MAP for following differences:

Lateral distance shifts in the Waypoints of the lane: Ignore them if the shift is less than $D_s$, e.g. 20 cm, or a threshold distance.

In one embodiment, $D_s$ is defined e.g. based on lane width or average vehicle length or width, or based on D. For example, $D_s$ is set equal to D.

In one embodiment, $D_s$ is adjusted based on historical data, or corrected by human expert periodically.

Connection lane changes: Changes in possible maneuver codes of the lane and the connected lane lists.

Change in Signal-Phase matching.

In case the changes in the Base-Map and Look-aside Map are considerable (above a threshold), and base Map is failing to provide high-Map-matching results, while Look-aside MAP is able to provide high MAP-Matching results, consider upgrading Look-aside MAP in the following criteria:

Manual override is detected for upgrading existing Look-aside MAP.

The difference is seen consistently for more than e.g. a Day, or a specific time period $T_c$, and there are sufficient numbers of vehicles, $N_v$ (say e.g. 1000), in each of the lanes, for proper statistics and analysis. Cherry pick these differences and update them in Base-Map.

Decreasing Computations and Increasing Confidence in MAP-Generations: (See FIG. 40)

Some minimal information, when available, could be manually fed to the system allowing the system to identify vehicle movements accurately and generate better results, in a shorter time period. For example:

Approach Count, and Approach names

Lane numbers in each Approach and Lane-widths

Cross-Walks

Traffic controller-information (to which system to poll and get results)

Approximate intersection-Diamond region dimensions, or average/typical of those dimensions from other locations Safety Consideration:

Detecting an idle vehicle (or Breakdown vehicle or accident vehicle or a closed lane) and share the location of this vehicle with other vehicles make this concept of map extend, to have a safety attribute.

Figure 18:
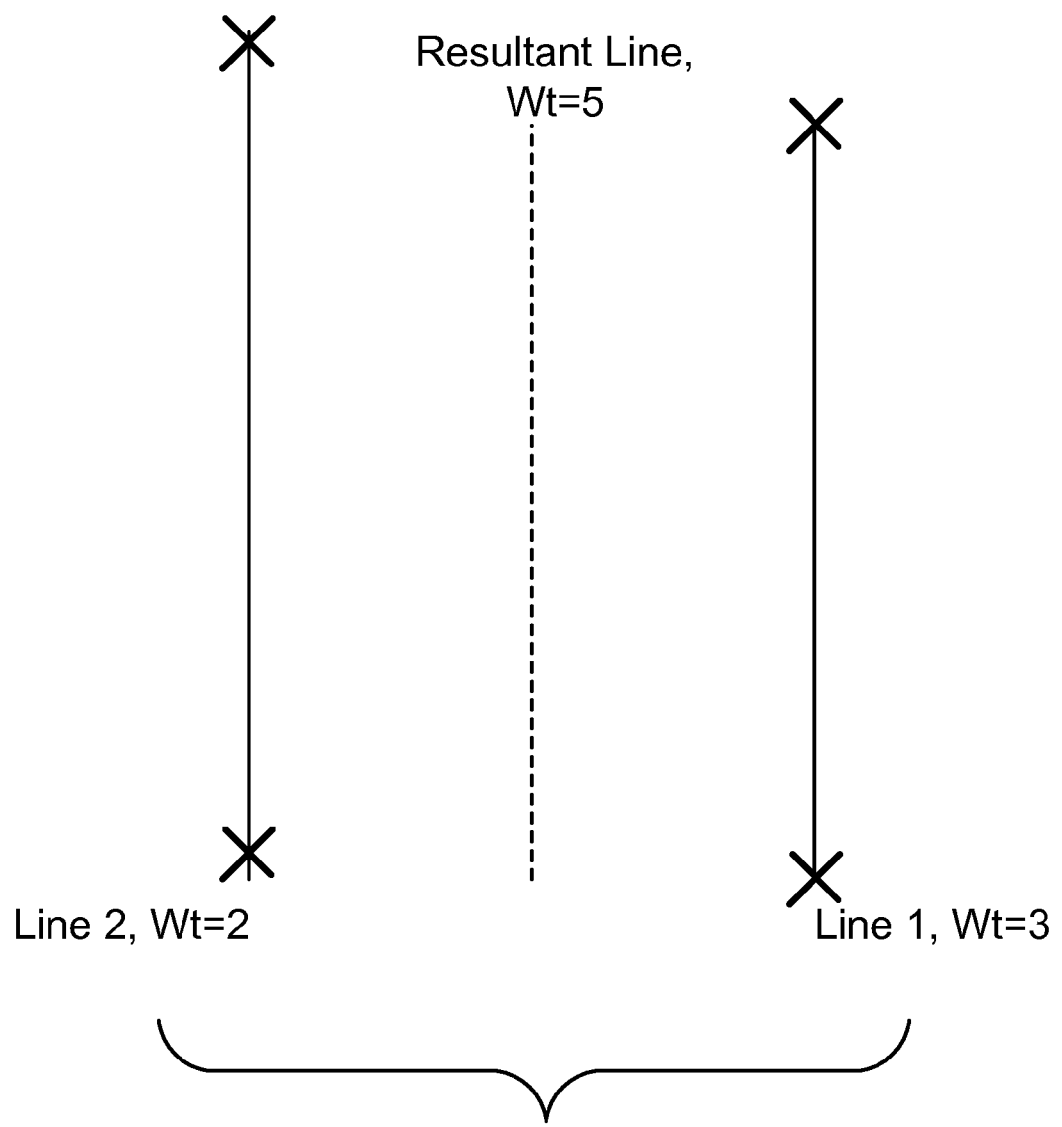
FIG. 18 is for one embodiment of the invention, for step 1, generating lanes.
Figure 19:
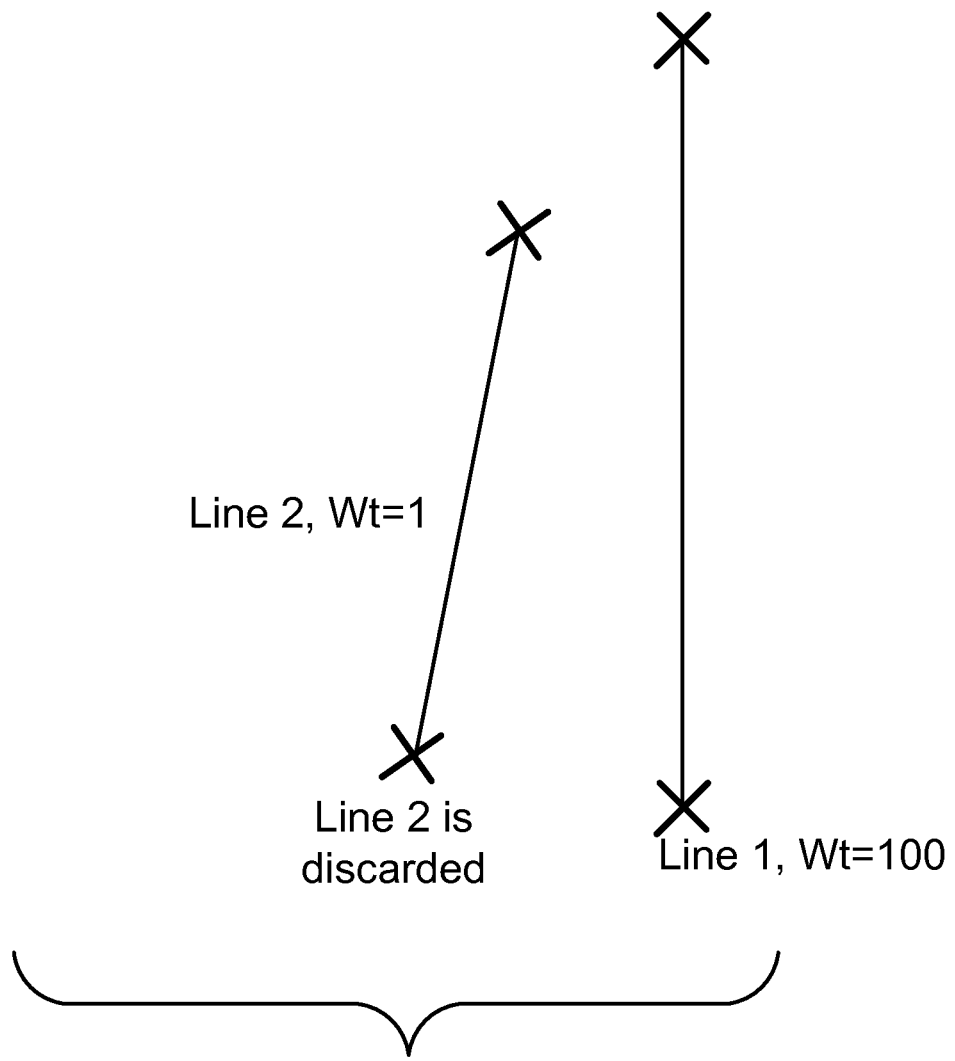
FIG. 19 is for one embodiment of the invention, for step 1, generating lanes.
Figure 20:
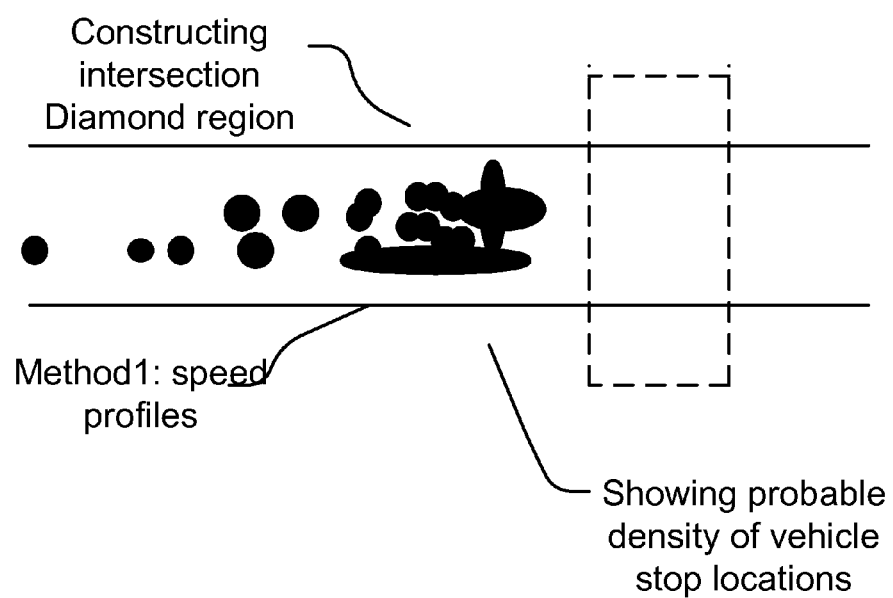
FIG. 20 is for one embodiment of the invention, for step 2, Method 1, constructing Intersection (INTX) Diamond Region.
Figure 21:
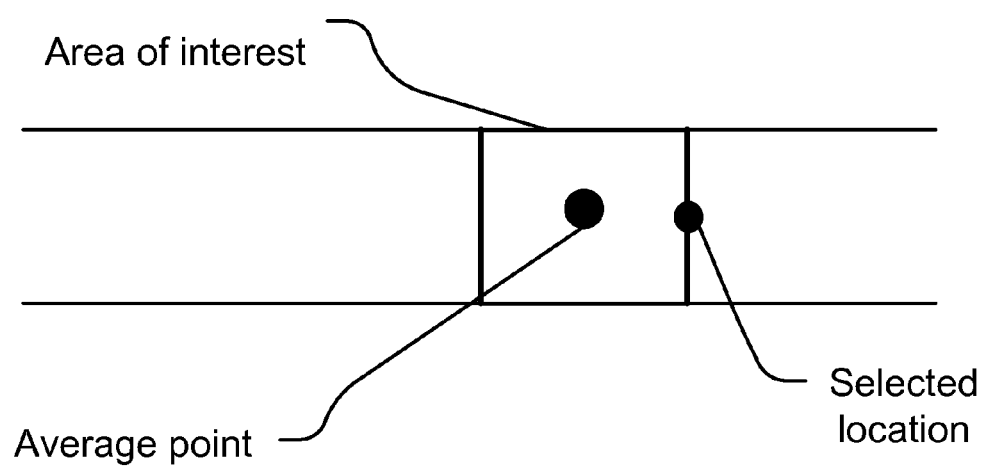
FIG. 21 is for one embodiment of the invention, for step 2, Method 1, constructing INTX Diamond Region.
Figure 22:
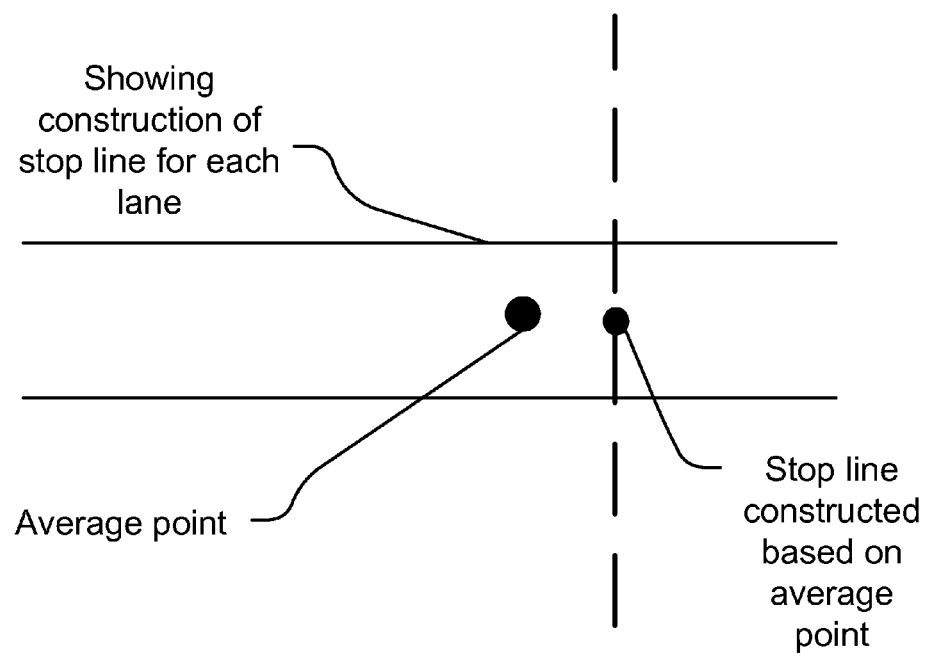
FIG. 22 is for one embodiment of the invention, for step 2, Method 1, constructing INTX Diamond Region.
Figure 23:
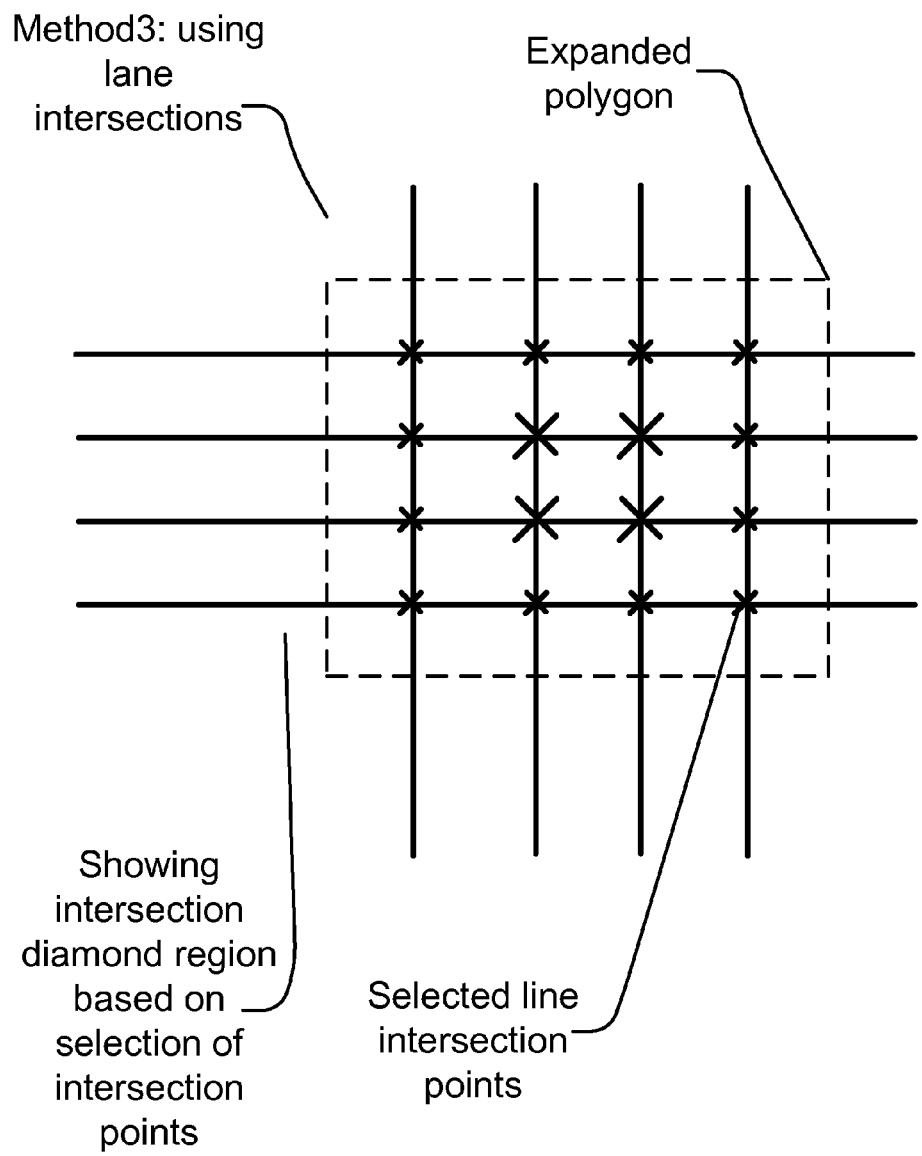
FIG. 23 is for one embodiment of the invention, for step 2, Method 3, using lane intersections.
Figure 24:
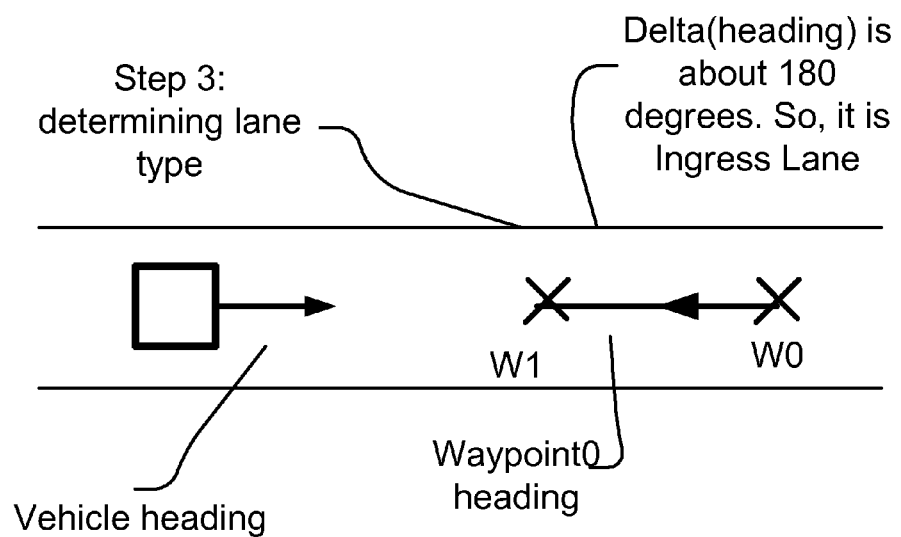
FIG. 24 is for one embodiment of the invention, for step 3, determining lane type.
Figure 25:
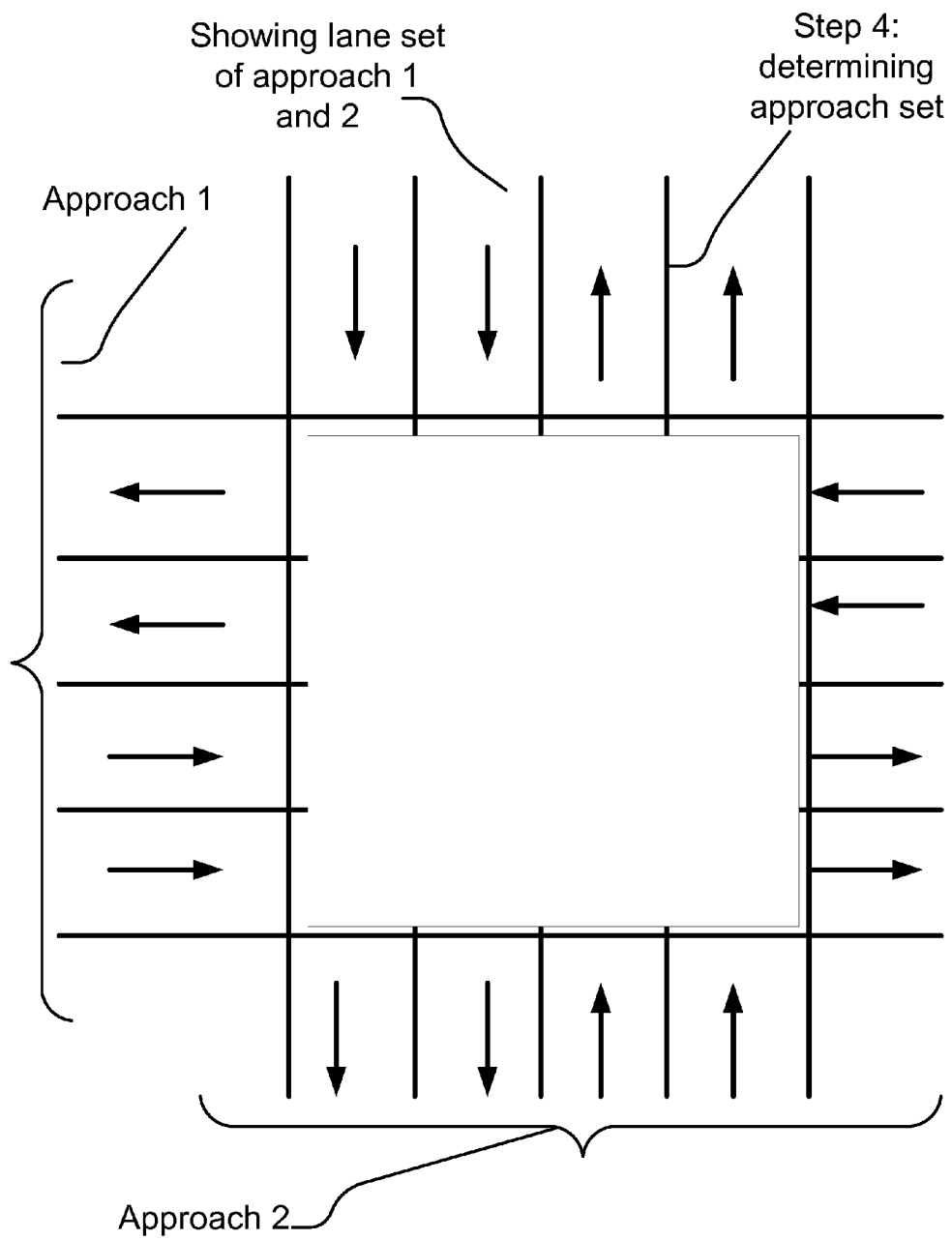
FIG. 25 is for one embodiment of the invention, for step 4, determining approach set.

FIG. 18 is for one embodiment of the invention, for step 1, generating lanes. FIG. 19 is for one embodiment of the invention, for step 1, generating lanes. FIG. 20 is for one embodiment of the invention, for step 2, constructing INTX Diamond Region. FIG. 21 is for one embodiment of the invention, for step 2, constructing INTX Diamond Region. FIG. 22 is for one embodiment of the invention, for step 2, constructing INTX Diamond Region. FIG. 23 is for one embodiment of the invention, for Method 3, using lane intersections. FIG. 24 is for one embodiment of the invention, for step 3, determining lane type. FIG. 25 is for one embodiment of the invention, for step 4, determining approach set.

Figure 26:
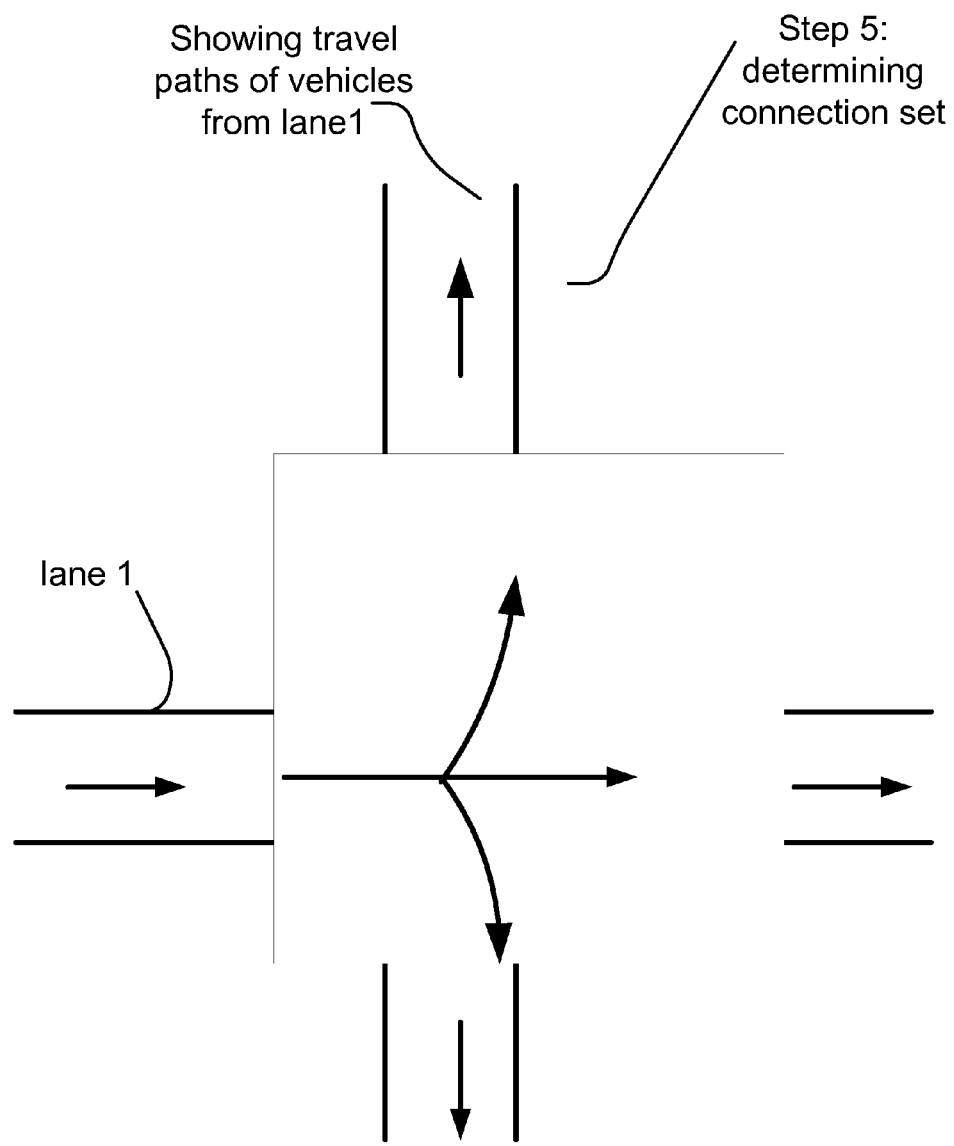
FIG. 26 is for one embodiment of the invention, for step 5, determining connection set.
Figure 27:
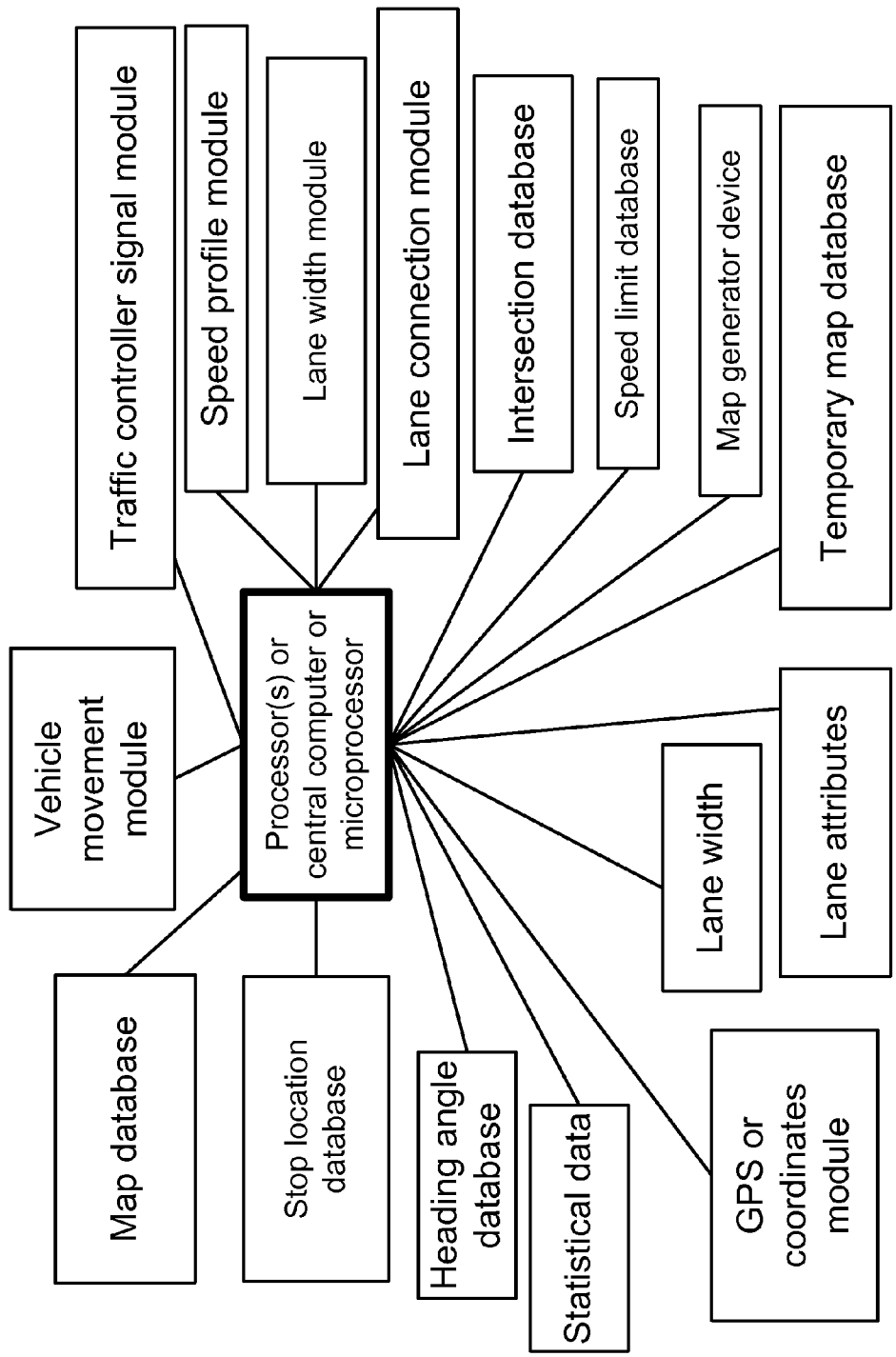
FIG. 27 is for one embodiment of the invention, for a system of creating, storing, and updating local dynamic MAP database with safety attribute.
Figure 28:
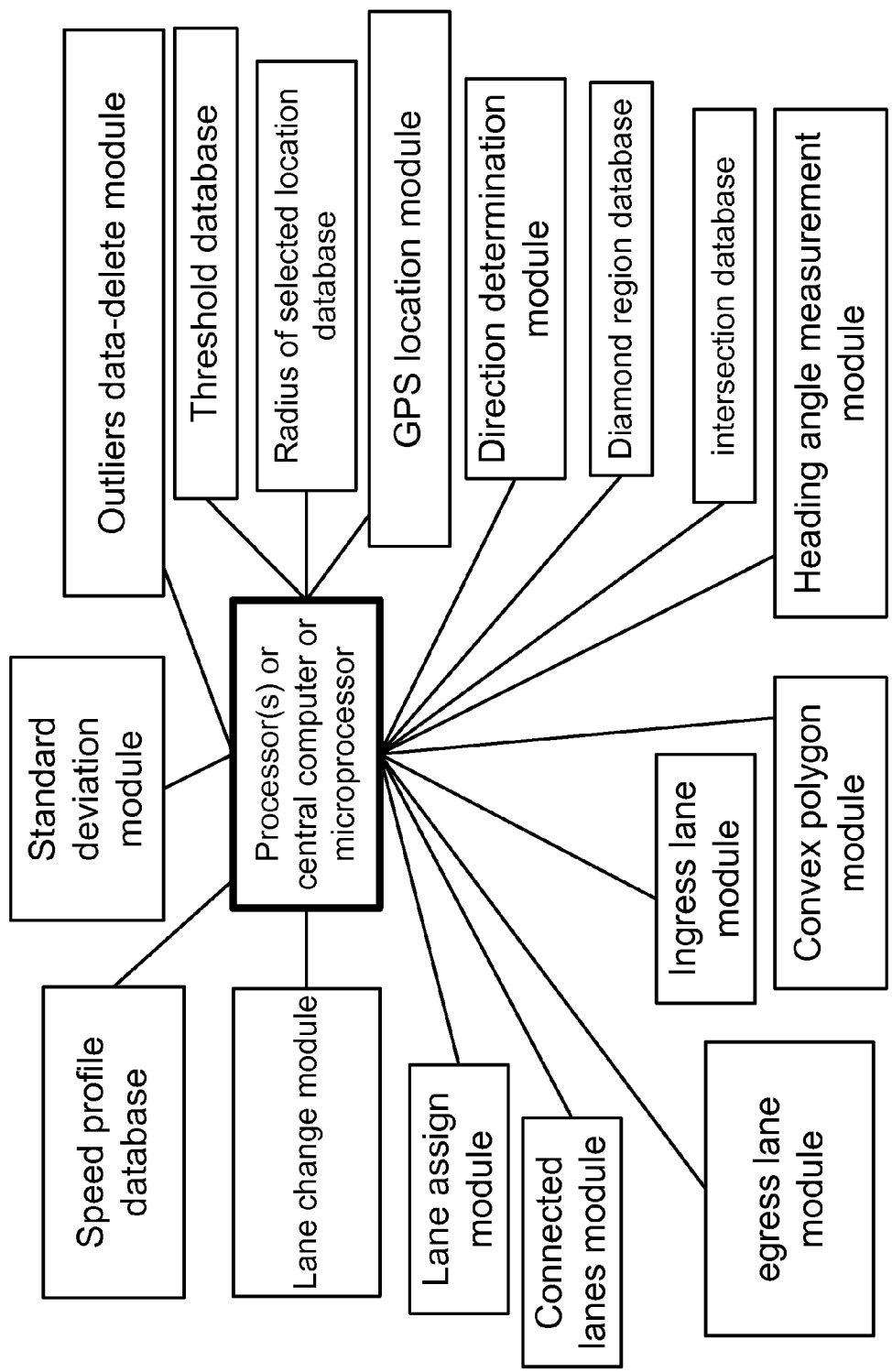
FIG. 28 is for one embodiment of the invention, for a system of creating, storing, and updating local dynamic MAP database with safety attribute.

FIG. 26 is for one embodiment of the invention, for step 5, determining connection set. FIG. 27 is for one embodiment of the invention, for a system of creating, storing, and updating local dynamic MAP database with safety attribute. FIG. 28 is for one embodiment of the invention, for a system of creating, storing, and updating local dynamic MAP database with safety attribute.

Figure 29:
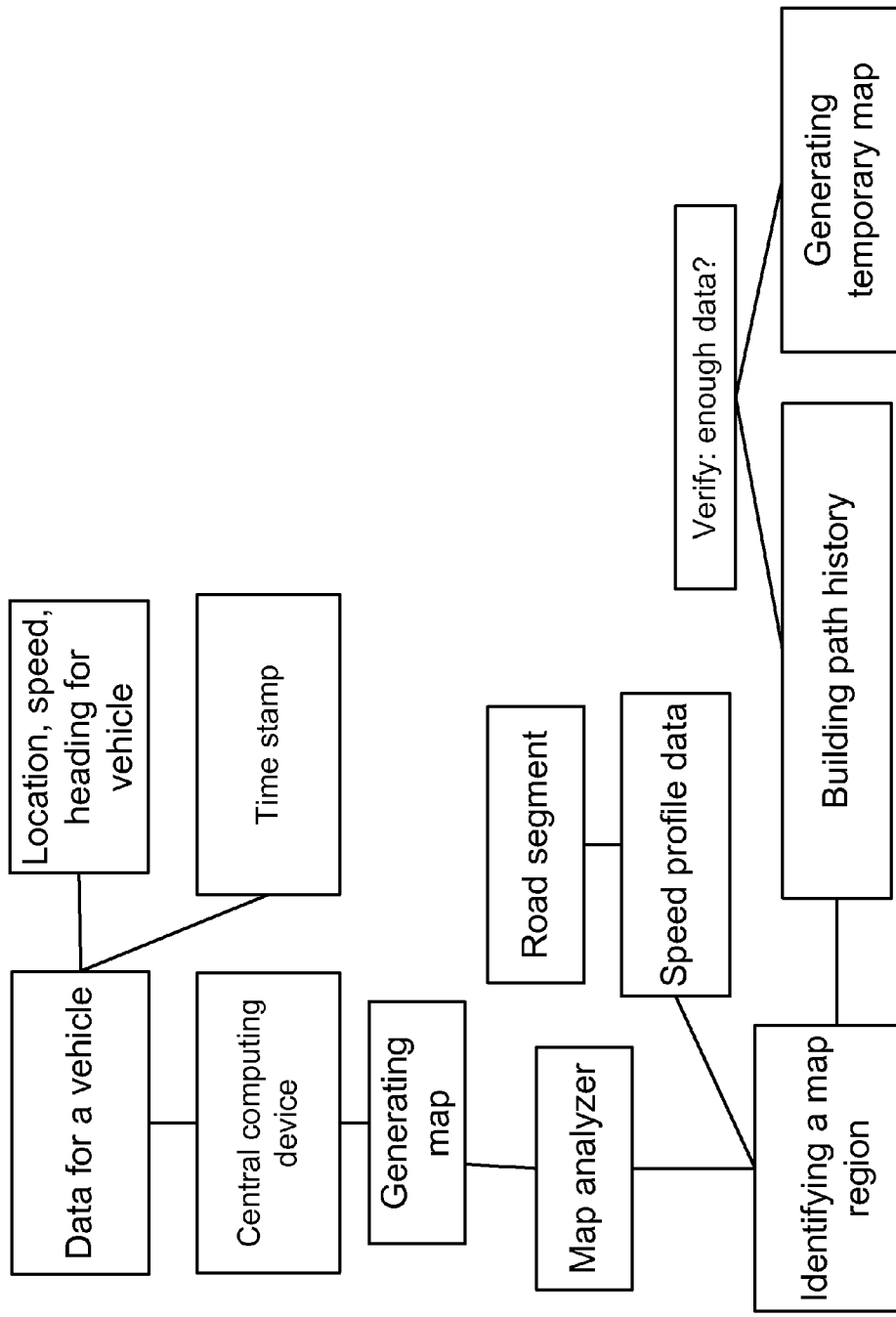
FIG. 29 is for one embodiment of the invention, for a system of map generation. It generates maps using vehicle data such as location, speed, and heading, along with time stamp.

FIG. 29 is for one embodiment of the invention, for a system of map generation. It generates maps using vehicle data such as location, speed, and heading, along with time stamp. It identifies map region using speed profile data collected on each road segment. It builds path history for each vehicle data. It generates temporary map when enough data is captured.

Figure 30:
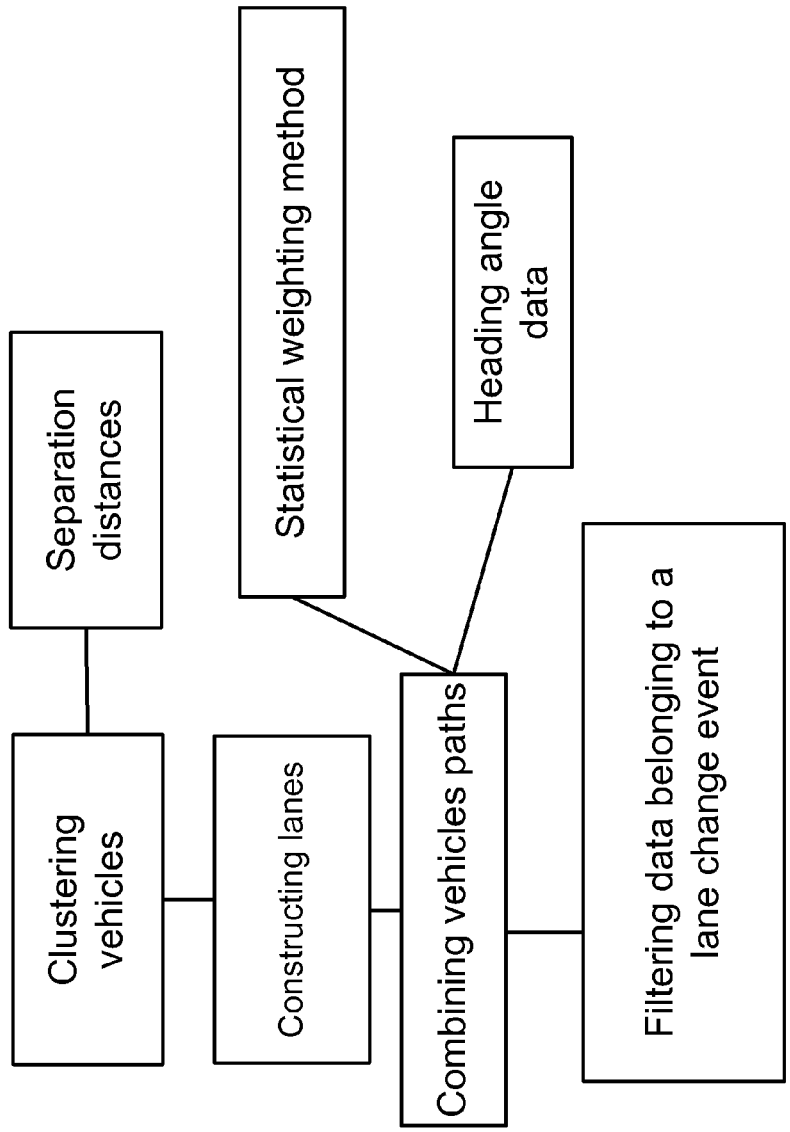
FIG. 30 is for one embodiment of the invention, for a system of lane generation. It constructs lanes by clustering vehicles path and combining vehicle paths inside the clusters.

FIG. 30 is for one embodiment of the invention, for a system of lane generation. It constructs lanes by clustering vehicles path and combining vehicle paths inside the clusters. It clusters vehicle paths using separation distance. It combines vehicle path using statistical weighting method. It combines vehicle path using heading angle data. It filters the data that belongs to lane change event.

Figure 31:
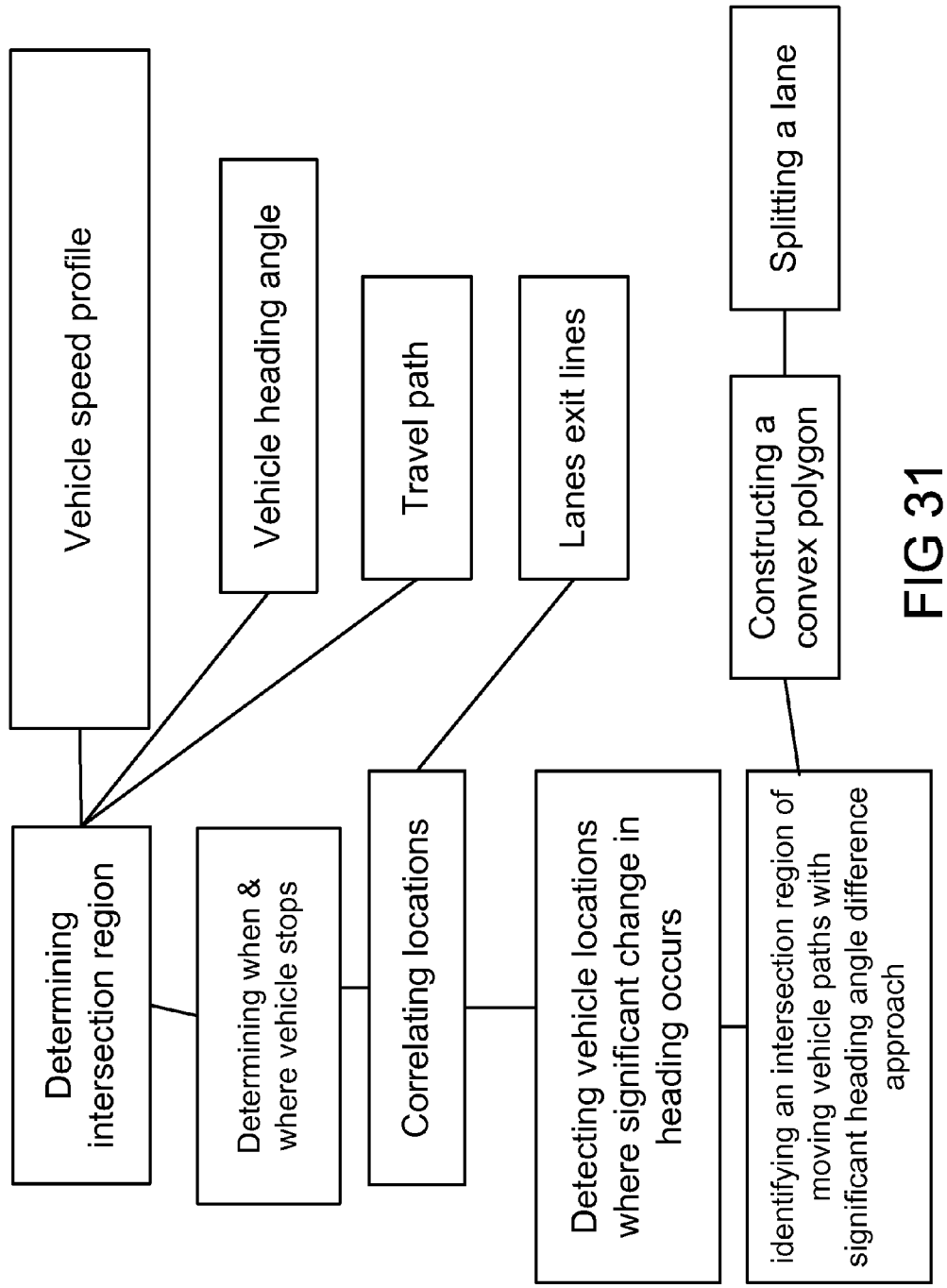
FIG. 31 is for one embodiment of the invention, for a system of determining intersection and lanes splitting. It determines intersection region using vehicles speed profiles, vehicles heading angles, and vehicles travel path intersects.

FIG. 31 is for one embodiment of the invention, for a system of determining intersection and lanes splitting. It determines intersection region using vehicles speed profiles, vehicles heading angles, and vehicles travel path intersects. It detects when and where vehicles have stopped. Stopped vehicles locations are correlated with the lanes exit lines. It detects vehicle locations where significant change in the heading has occurred. It identifies intersection region of moving vehicle paths with significant heading angle difference approach. It constructs convex polygon. It splits lane using the polygon region.

Figure 32:
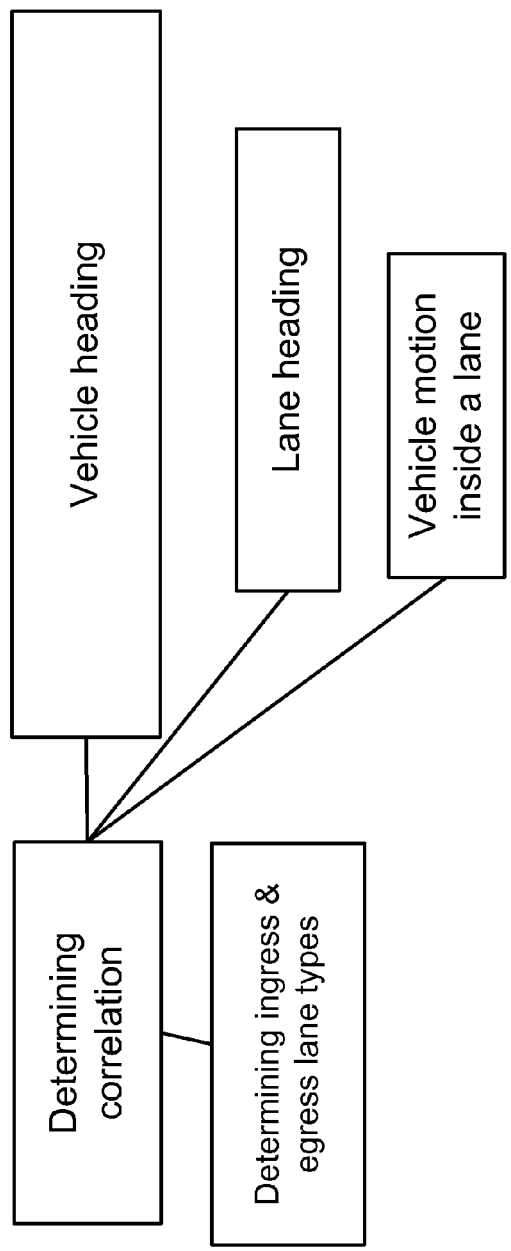
FIG. 32 is for one embodiment of the invention, for a system of determining Lane type (Ingress/Egress).

FIG. 32 is for one embodiment of the invention, for a system of determining Lane type (Ingress/Egress). It determines "Ingress/Egress" lane type using correlation between vehicle heading and lane heading, and vehicle motion inside the lane.

Figure 33:
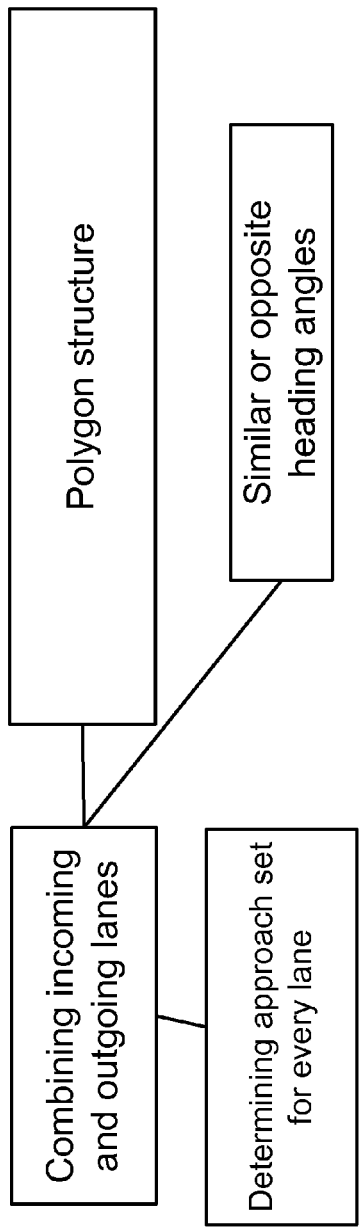
FIG. 33 is for one embodiment of the invention, for a system of determining the approach set for every lane.

FIG. 33 is for one embodiment of the invention, for a system of determining the approach set for every lane. It determines the approach set for every lane by combining the incoming and outgoing lanes that fall on one side of the polygon and have similar or opposite heading angle.

Figure 34:
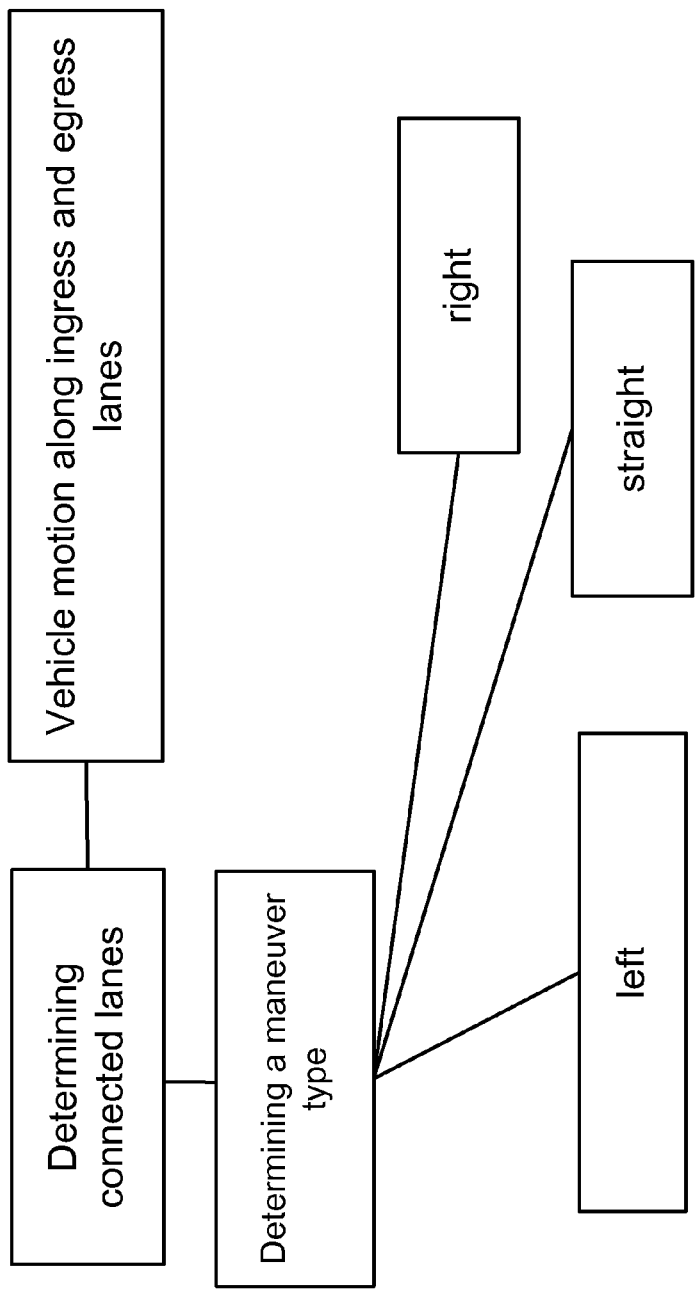
FIG. 34 is for one embodiment of the invention, for a system of determining connecting lanes and movement state for ingress lane.

FIG. 34 is for one embodiment of the invention, for a system of determining connecting lanes and movement state for ingress lane. It determines connected lanes by observing vehicles motion along ingress and egress lane. It determines the maneuver type to go between ingress and egress (left/right/straight).

Figure 35:
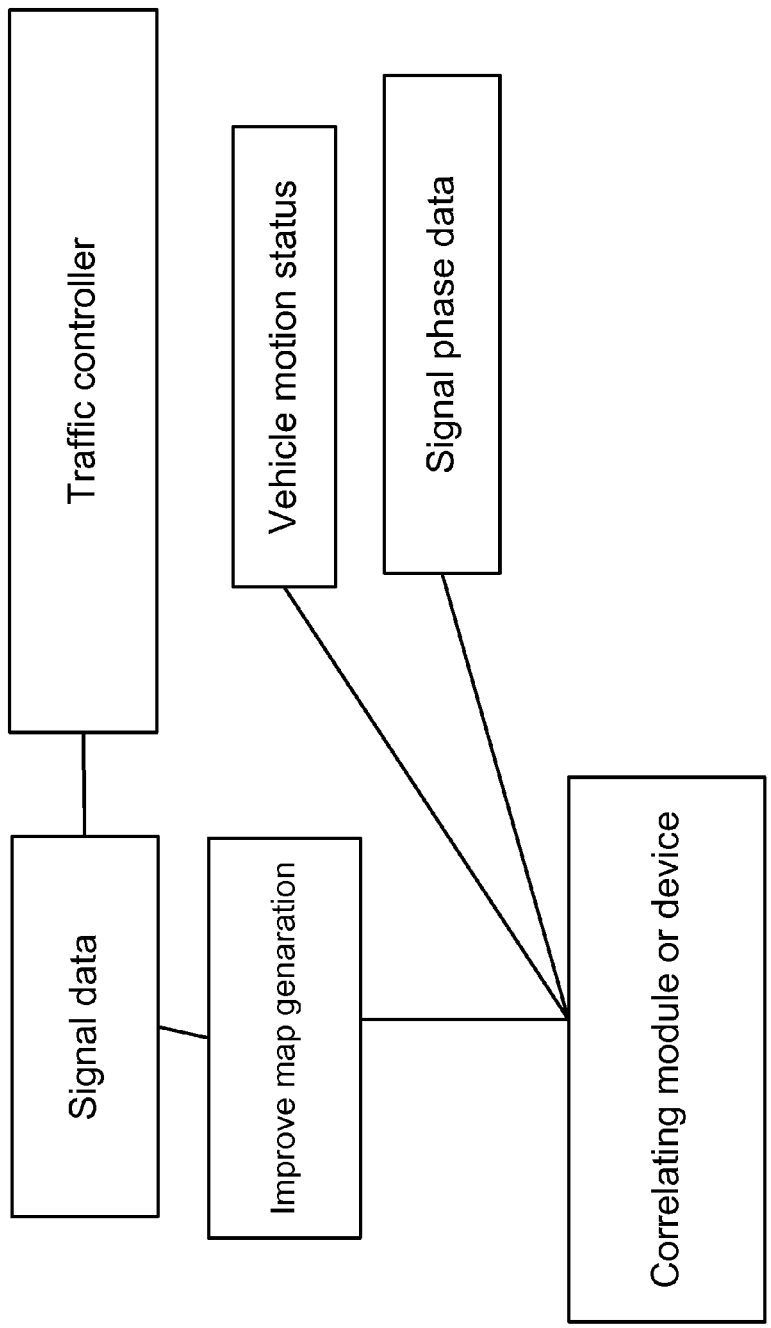
FIG. 35 is for one embodiment of the invention, for a system of MAP Generation. Improved map generation uses signal data available from traffic controller.

FIG. 35 is for one embodiment of the invention, for a system of MAP Generation. Improved map generation uses signal data available from traffic controller. It correlates the traffic controller signal phase data with the vehicle motion status (e.g., as: "is going to stop", "has stopped", "is moving from stop", "moving", and etc.).

Figure 36:
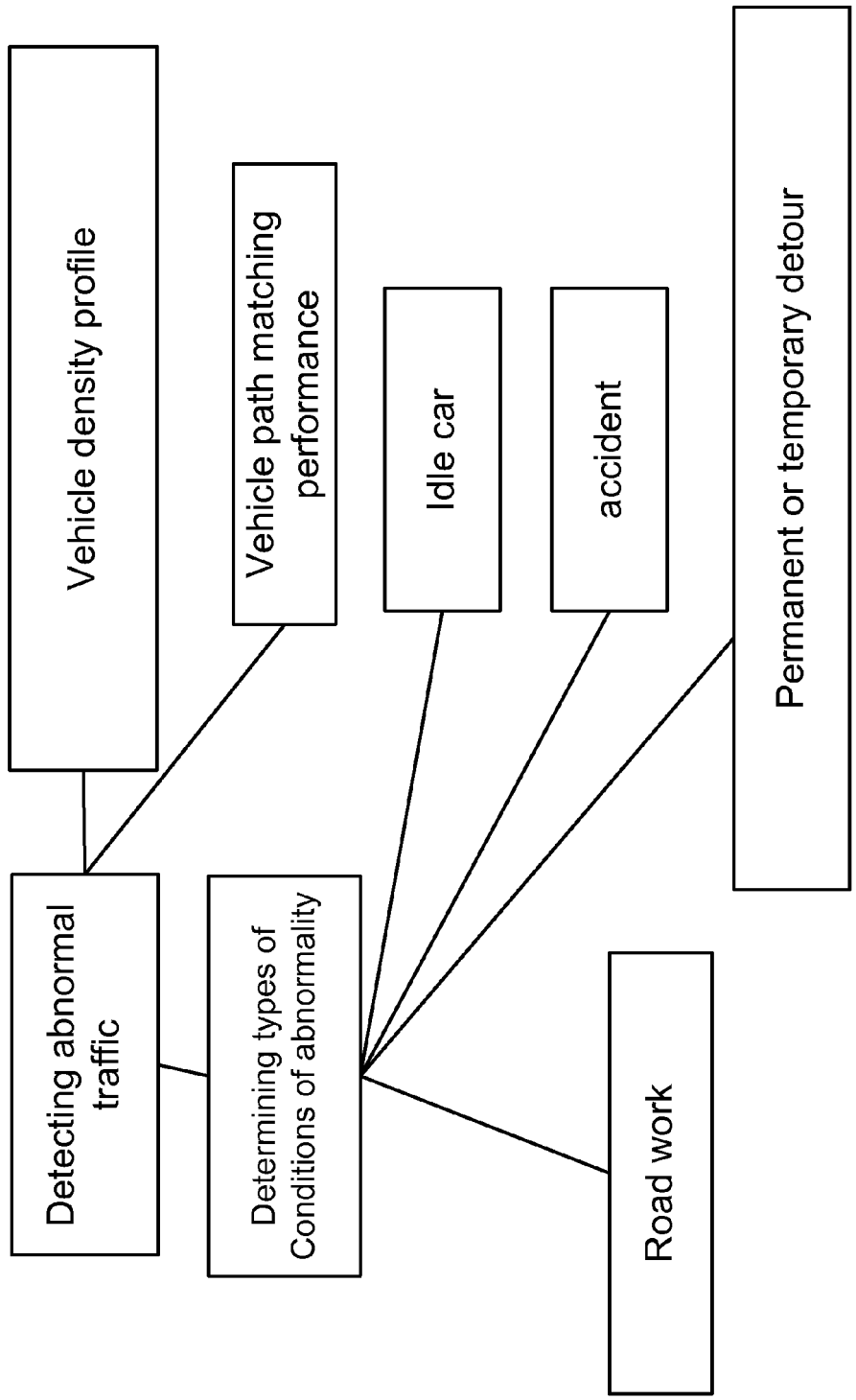
FIG. 36 is for one embodiment of the invention, for a system of Map maintenance. Abnormal traffic condition is detected by observing the vehicle density profile and the vehicle path matching performance.

FIG. 36 is for one embodiment of the invention, for a system of Map maintenance. Abnormal traffic condition is detected by observing the vehicle density profile and the vehicle path matching performance. Different types of conditions that cause the abnormality are detected, such as idle vehicle, accident, work zone, or even a permanent or temporary change in the road.

Figure 37:
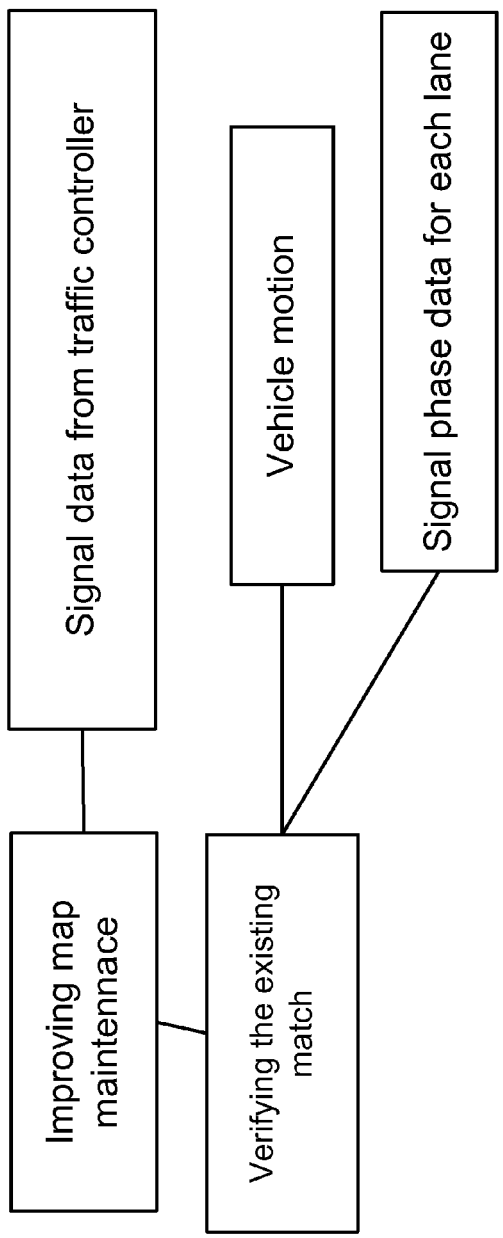
FIG. 37 is for one embodiment of the invention, for a system of Map maintenance. Improved map maintenance uses signal data from traffic controller.

FIG. 37 is for one embodiment of the invention, for a system of Map maintenance. Improved map maintenance uses signal data from traffic controller. It verifies that existing matching between vehicle motion and signal phase data for each lane is still the same.

Figure 38:
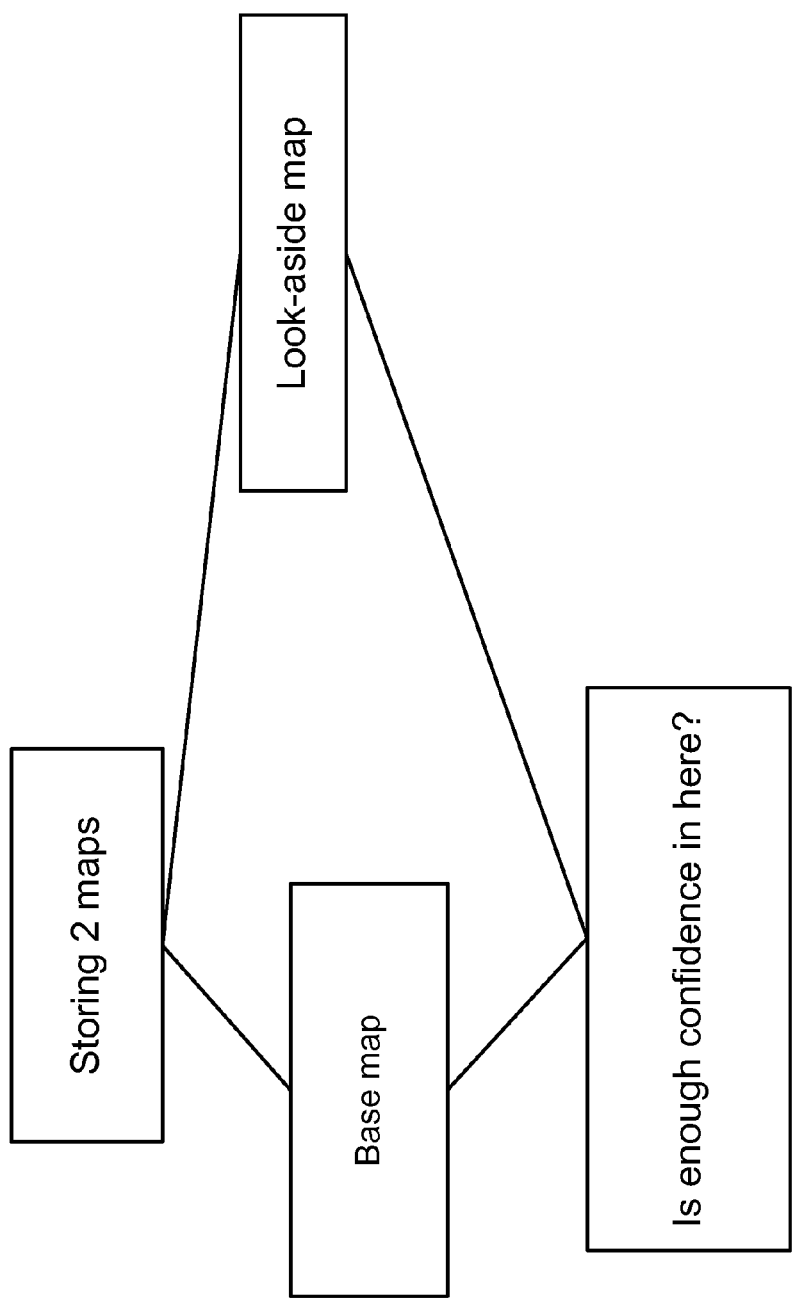
FIG. 38 is for one embodiment of the invention, for a system of Map publishing, storing, and updating mechanism.

FIG. 38 is for one embodiment of the invention, for a system of Map publishing, storing, and updating mechanism. Two maps are stored: base map and look aside map. At initialization, no base map is available. Look aside map can be moved to base map when enough confidence is built. The look aside replaces the corresponding part of the base map when its confidence level becomes better than the base map.

Figure 39:
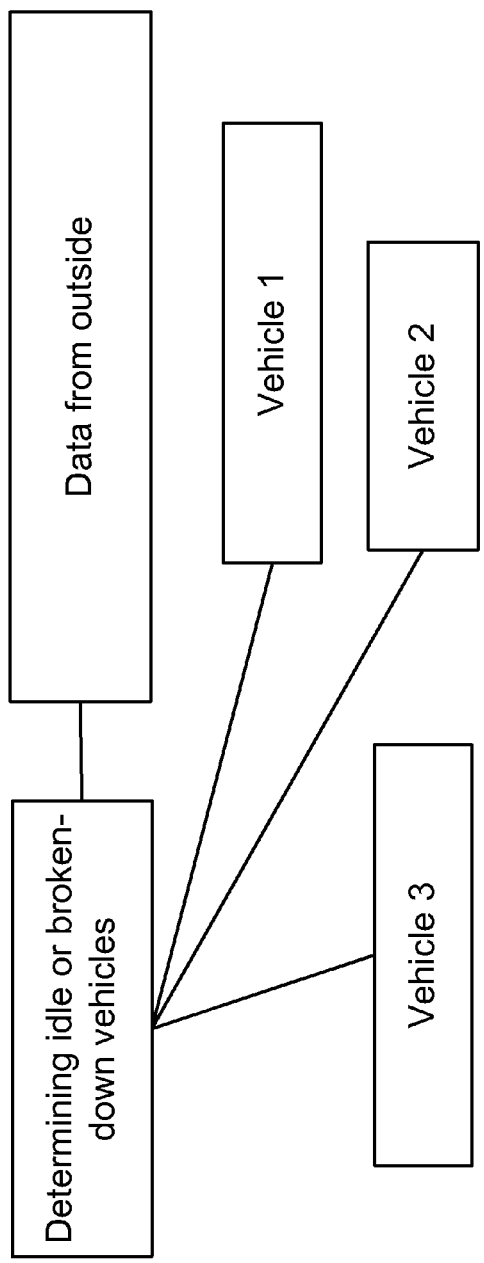
FIG. 39 is for one embodiment of the invention, for a system of Safety Consideration.

FIG. 39 is for one embodiment of the invention, for a system of Safety Consideration. It detects an idle vehicle (breakdown vehicle) and shares the location of this vehicle with other vehicles, for map, to have a safety attribute. An embodiment of the invention is a method for creating, storing, and updating local dynamic map database with safety attribute, for a street or highway, said method comprising: a central computer receiving speed profiles from vehicles in said street or highway from an input device; an analyzer module or device determining vehicular density for said vehicles in said street or highway; an identifier module or device determining lane attributes for a lane in said street or highway; receiving traffic controller data for said street or highway; integrating said traffic controller data for said street or highway into map data; identifying temporary and permanent changes in said map data; updating said map data; and identifying an obstacle of mobility attribute in said map data.

An embodiment of the invention is one of the following:
identifying intersections for said street or highway.
identifying an idle vehicle in said street or highway.
identifying an accident in said street or highway.
using a short range communication device.
using an on-board device in a car.
using a road side equipment.
determining a status of said traffic controller data.
determining a correlation with a status of said traffic controller data.
storing said map data.
generating a basic safety message.
storing location, heading, and speed of a car.
storing a time-stamp for a basic safety message.
checking an accuracy of past history points.
generating lanes for said street or highway.
combining paths for said street or highway.
using statistical analysis for paths.
using weights for paths.
detecting a lane change event.
filtering outlier samples in statistical analysis.

In one embodiment, the map can be generated in a central processor. In one embodiment, the map can be generated in distributed processors, and later merged together as one map. The advantage of the distributed-processors method is that if for any reason the communication or the processing is interrupted, the other processors can partially supply the data for the vehicles, for navigation and operation. In one embodiment, the processor is mobile itself, e.g., installed in a car, satellite, drone, balloon, or airplane. In one embodiment, the processor is stationary, at a fixed location. In one embodiment, the processor network manages the map, e.g., in a server farm.

In one embodiment, each server covers one part of the city or area. In one embodiment, the geographical areas have overlaps for coverage. In one embodiment, there are redundancies between coverage of different units. In one embodiment, there is a correction based on the redundancies between coverage of different units, to find and filter out the erroneous data. In one embodiment, there is an averaging process based on the redundancies between coverage of different units, to average the data for more accurate results. In one embodiment, there is a weighted-averaging process based on the redundancies between coverage of different units, to weighted-average the data for more accurate results, with more weights for the more reliable units or sources, or higher weights for the results that are closer to the center of curve representing the distribution of values, i.e., eliminating or reducing the fringe results or erroneous data.

In one embodiment, we have data distributed and sold to a third party subscribing to our service and data flow, as updates and feed, so that they can manage the traffic or control cars or analyze the data for marketing purposes or finding the trends. For example, from the traffic patterns, one can conclude that how many cars are going to the new mall or store and how long they stay at that mall in average, in terms of hours, and at what hours or which days, which will help the mall to plan for marketing and sales, e.g., to order merchandise in advance for specific people or specific time or season. In addition, from the traffic pattern, one can conclude that which areas or streets are most likely the source of cars to a specific mall or region, statistically, so that from the social or income data from a target neighborhood, one can find the social or income level of people likely going to a specific mall, and at what time during the day, as a probability distribution, so that the average, or median, or aggregate, or expected value, or standard deviation can be extracted or estimated for each parameter under study, e.g., income level or average age or gender, e.g., a stay-home or vacationing parent driving to mall during day time on weekdays (e.g., not working at an office or regular job or vacationing, so that have enough time during the day to go to mall during weekdays and non-holidays). Such estimates and statistics for patterns or behaviors for people are very valuable for marketing and sales people who want to predict and plan ahead. Thus, they buy these data and analyze and extract patterns from them for their specific purposes.

Another purpose or usage for such data is for traffic planning or city expansion planning or metro rail planning for future, e.g., to remove congestion or reduce traffic around main roads or plan for gas stations or malls or office buildings or metro stations or train stations, or estimate the trend for population growth or movement or concentration throughout the years, by comparing such traffic data in time, e.g., to plan schools for future for a district. Aggregate and trend and direction results are very useful and valuable for people in charge or decision makers for all of the private and public sectors. For example, for heavily congested and concentrated intersections and roads, the real estate market and values may go up, due to demand for commercial space and office space. Or, the parking fee rate per hour or per day may go up, due to the demand or shortage for parking space, at least during the time that are the peak for traffic, from our data collected for various times and regions.

Here, we describe some of our embodiments/examples, as components of our system:
Map Generation: (See FIG. 29)
  It generates maps using vehicle data such as location, speed, and heading, along with time stamp.
  It identifies map region using speed profile data collected on each road segment.
  It builds path history for each vehicle data.
  It generates temporary map when enough data is captured.
Generating Lanes: (See FIG. 30)
  It constructs lanes by clustering vehicles path and combining vehicle paths inside the clusters.
  It clusters vehicle paths using separation distance.
  It combines vehicle path using statistical weighting method.
  It combines vehicle path using heading angle data.
  It filters the data that belongs to lane change event.
Determining Intersection and Lanes Splitting: (See FIG. 31)
  It determines intersection region using vehicles speed profiles, vehicles heading angles, and vehicles travel path intersects.
  It detects when and where vehicles have stopped.
  Stopped vehicles locations are correlated with the lanes exit lines.
  It detects vehicle locations where significant change in the heading has occurred.
  It identifies intersection region of moving vehicle paths with significant heading angle difference approach.
  It constructs convex polygon.
  It splits lane using the polygon region.
Determining Lane Type (Ingress/Egress): (See FIG. 32)
  It determines "Ingress/Egress" lane type using correlation between vehicle heading and lane heading, and vehicle motion inside the lane.

Determining the Approach Set for Every Lane: (See FIG. 33)
　It determines the approach set for every lane by combining the incoming and outgoing lanes that fall on one side of the polygon and have similar or opposite heading angle.

Determining Connecting Lanes and Movement State for Ingress Lane: (See FIG. 34)
　It determines connected lanes by observing vehicles motion along ingress and egress lane.
　It determines the maneuver type to go between ingress and egress (left/right/straight).

More in MAP Generation: (See FIG. 35)
　Improved map generation uses signal data available from traffic controller.
　It correlates the traffic controller signal phase data with the vehicle motion status (e.g., as: "is going to stop", "has stopped", "is moving from stop", "moving", and etc.).

Map Maintenance: (See FIG. 36)
　Abnormal traffic condition is detected by observing the vehicle density profile and the vehicle path matching performance.
　Different type of conditions that causes the abnormality are detected, such as idle vehicle, accident, work zone, or even a permanent or temporary change in the road.

More in Map Maintenance: (See FIG. 37)
　Improved map maintenance uses signal data from traffic controller.
　It verifies that existing matching between vehicle motion and signal phase data for each lane is still the same.

Map Publishing, Storing, and Updating Mechanism: (See FIG. 38)
　Two maps are stored: base map and look aside map.
　At initialization, no base map is available. Look aside map can be moved to base map when enough confidence is built.
　The look aside replaces the corresponding part of the base map when its confidence level becomes better than the base map.

Safety Consideration: (See FIG. 39)
　It detects an idle vehicle (breakdown vehicle) and shares the location of this vehicle with other vehicles, for map, to have a safety attribute.

Description of the Overall System

Figure 2:
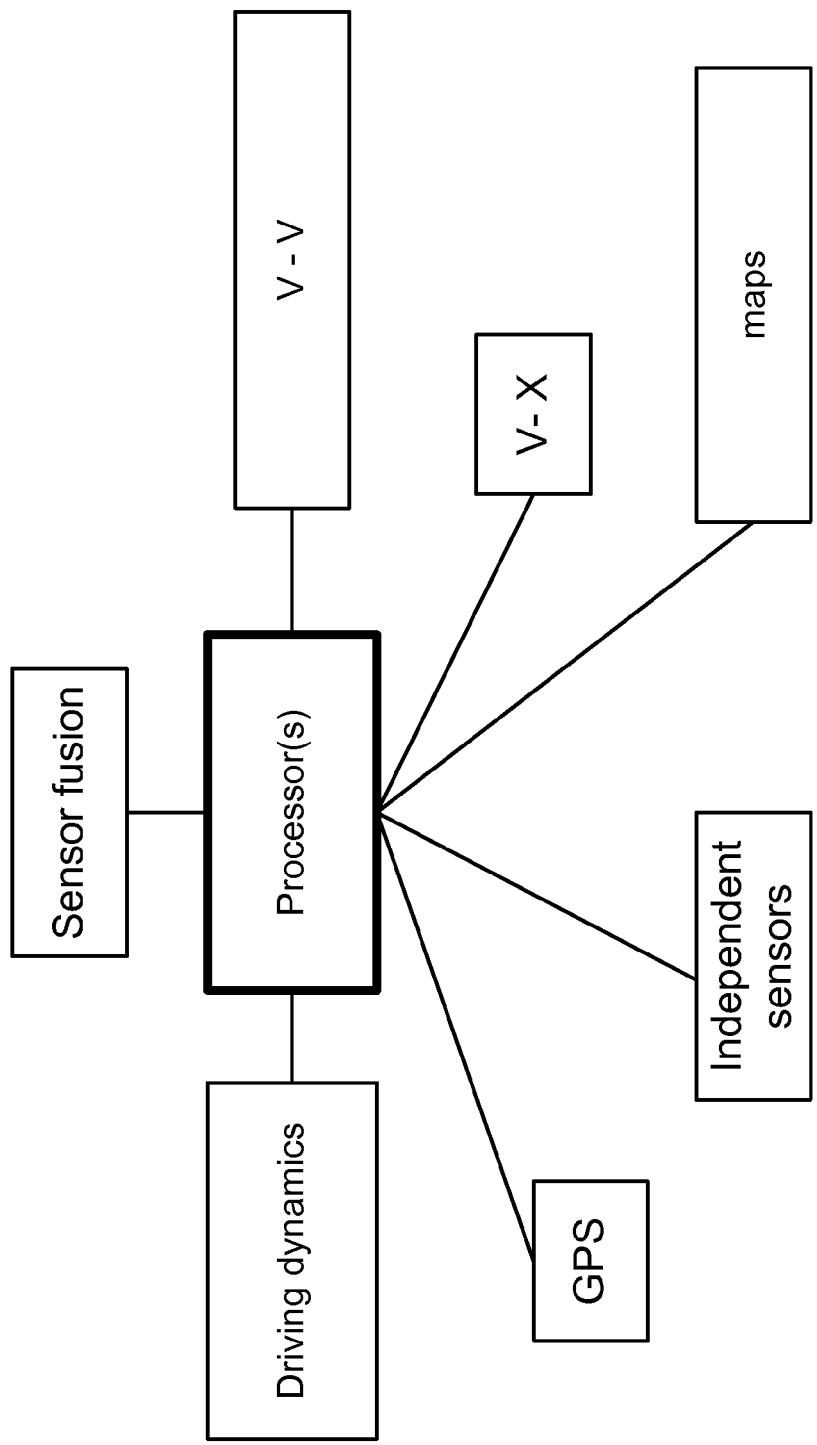
FIG. 2 is for one embodiment of the invention, for a system for automated vehicles.

Here, we describe the overall/general system for some of our embodiments above:

FIGS. 1-9 describe in details the presented automated vehicle system. FIGS. 10-17 explain some embodiments of the current invention. FIG. 1 is for one embodiment, as an example, for representation of development of fully automated vehicles, in stages, for progression toward fully automated vehicles. FIG. 2 is for one embodiment of the invention, for a system for automated vehicles, using GPS, independent sensors, maps, driving dynamics, and sensor fusions and integrations.

Figure 3:
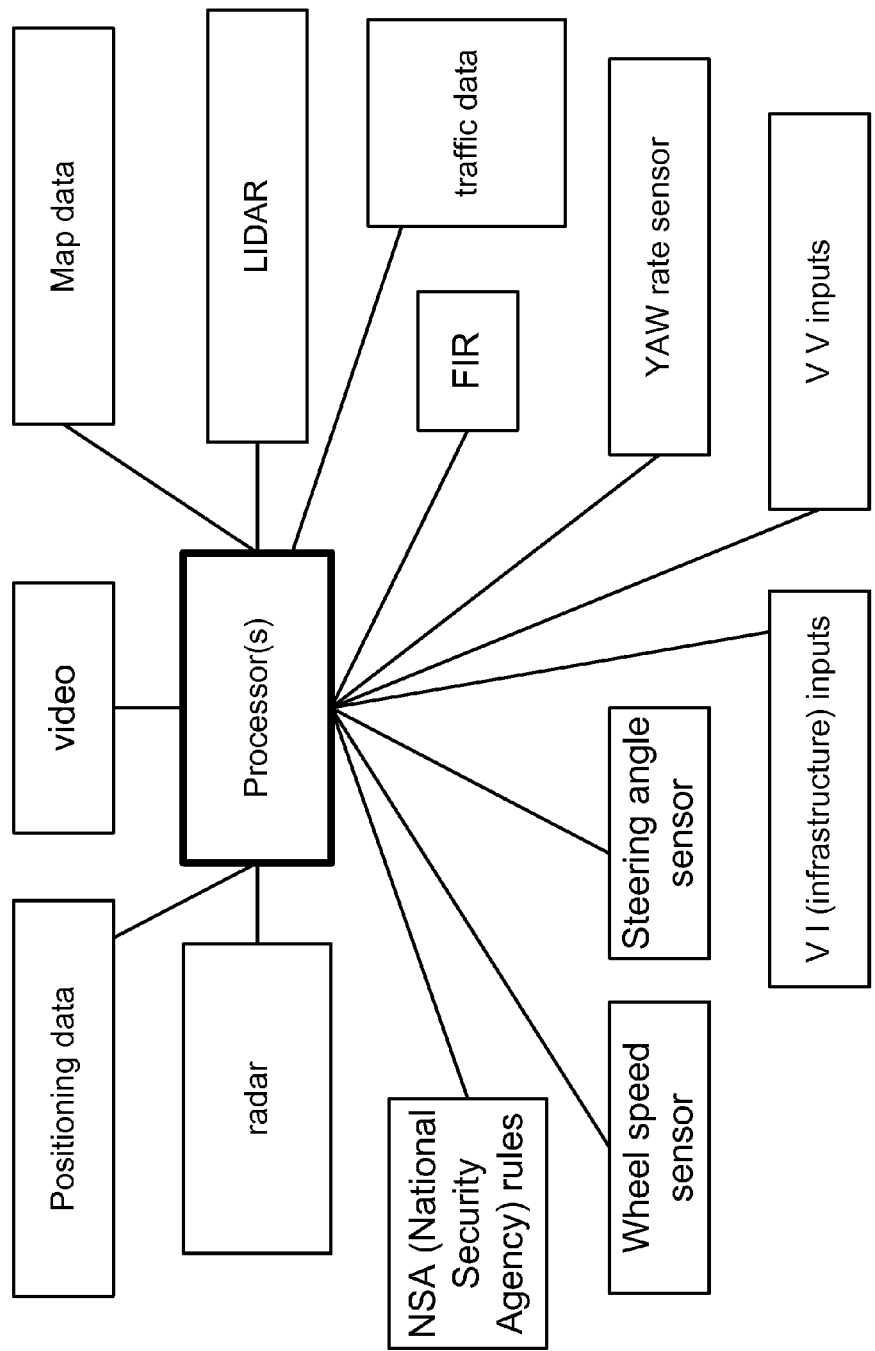
FIG. 3 is for one embodiment of the invention, for a system for automated vehicles.

FIG. 3 is for one embodiment of the invention, for a system for automated vehicles, with different measurement devices, e.g., LIDAR (using laser, scanner/optics, photodetectors/sensors, and GPS/position/navigation systems, for measuring the distances, based on travel time for light), radar, GPS, traffic data, sensors data, or video, to measure or find positions, coordinates, and distances. The government agencies may impose restrictions on security and encryption of the communications and data for modules and devices within the system, as the minimum requirements, as the hackers or terrorists may try to get into the system and control the vehicles for a destructive purpose. Thus, all of the components are based on those requirements imposed by the US or other foreign governments, to comply with the public safety.

Figure 4:
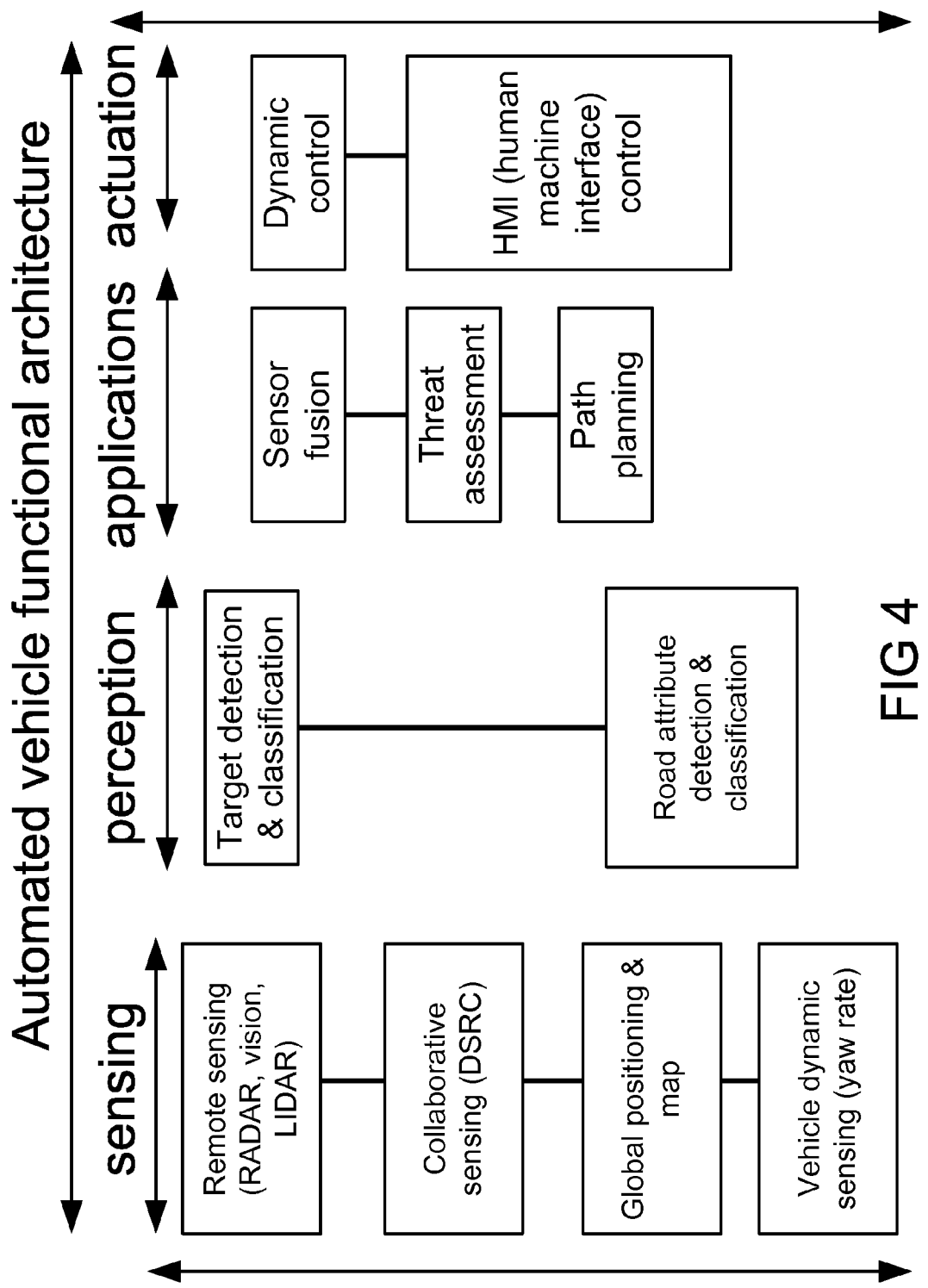
FIG. 4 is for one embodiment of the invention, for automated vehicle functional architecture.
Figure 5:
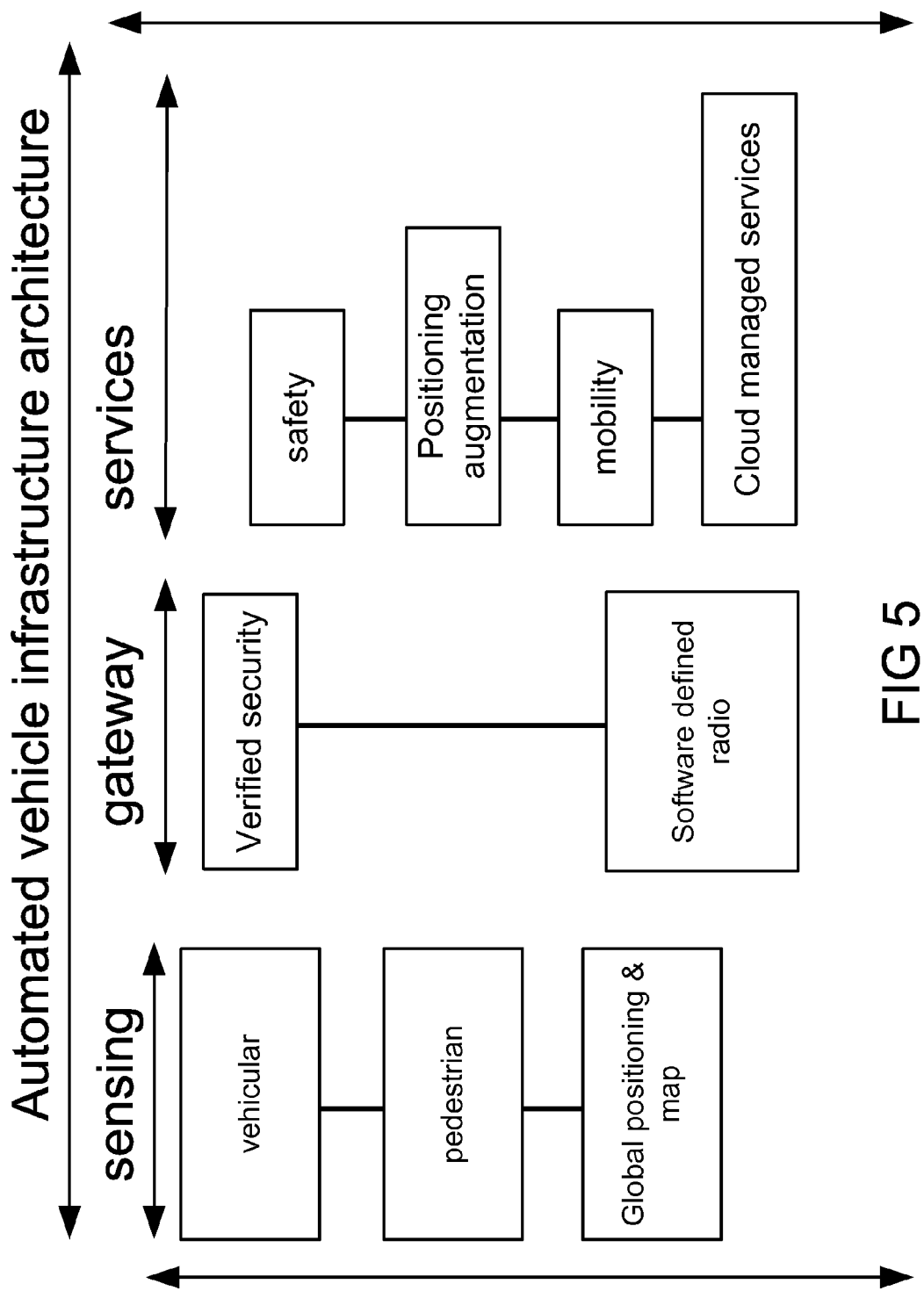
FIG. 5 is for one embodiment of the invention, for automated vehicle infrastructure architecture.

FIG. 4 is for one embodiment of the invention, for automated vehicle functional architecture, for sensing, perception, applications, and actuation. FIG. 5 is for one embodiment of the invention, for automated vehicle infrastructure architecture, for sensing, gateway, and services.

Figure 6:
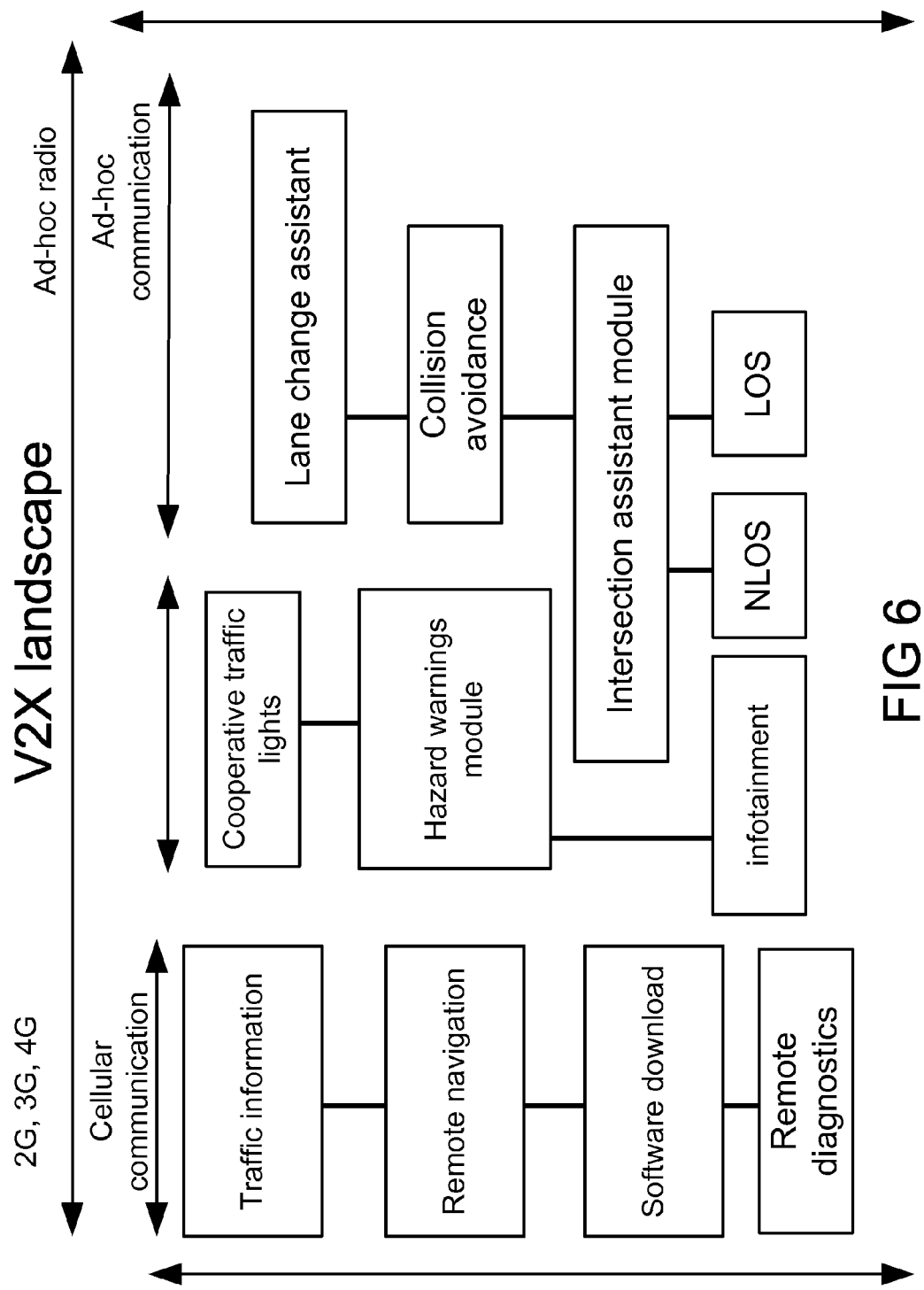
FIG. 6 is for one embodiment of the invention, for a system for V2X landscape, with components.
Figure 7:
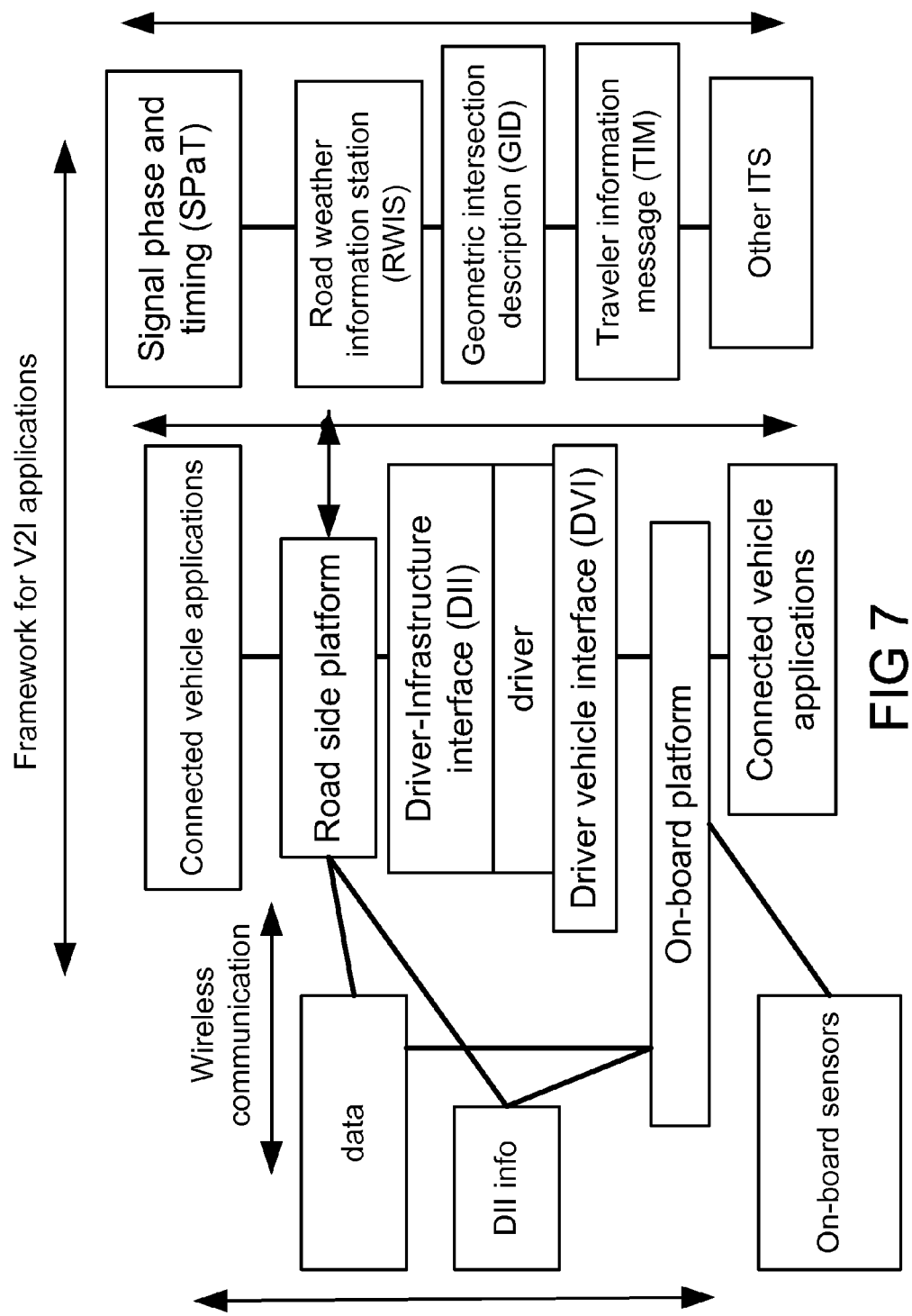
FIG. 7 is for one embodiment of the invention, for a system for framework for V2I applications, with components.

FIG. 6 is for one embodiment of the invention, for a system for V2X landscape, with components, for spectrum and range of frequencies and communications, for various technologies, for various purposes, for different ranges. FIG. 7 is for one embodiment of the invention, for a system for framework for V2I applications, with components, for roadside platform and on-board platform, using various messages and sensors.

Figure 8:
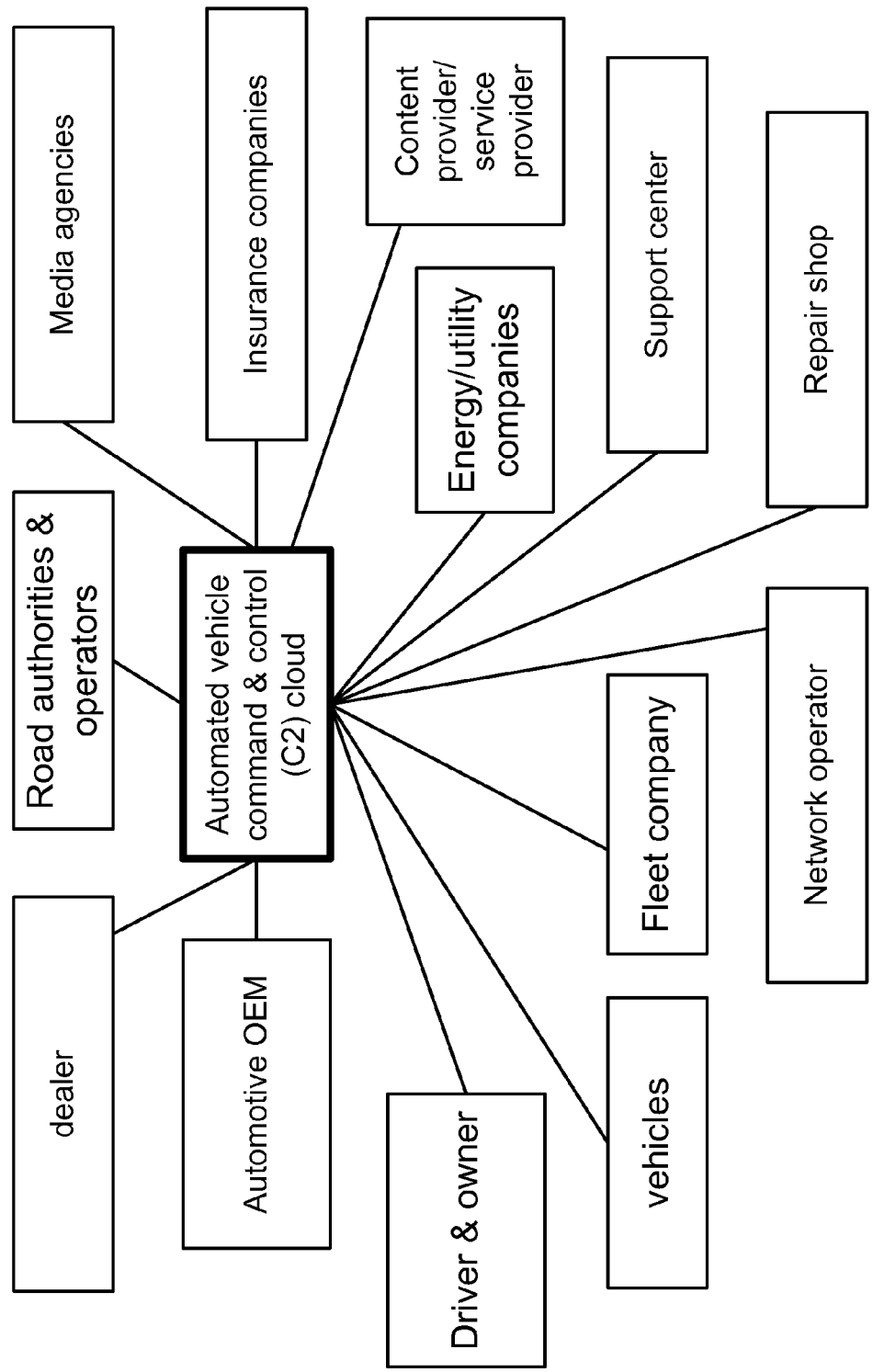
FIG. 8 is for one embodiment of the invention, for a system for automated vehicle command and control (C2) cloud, with components.
Figure 9:
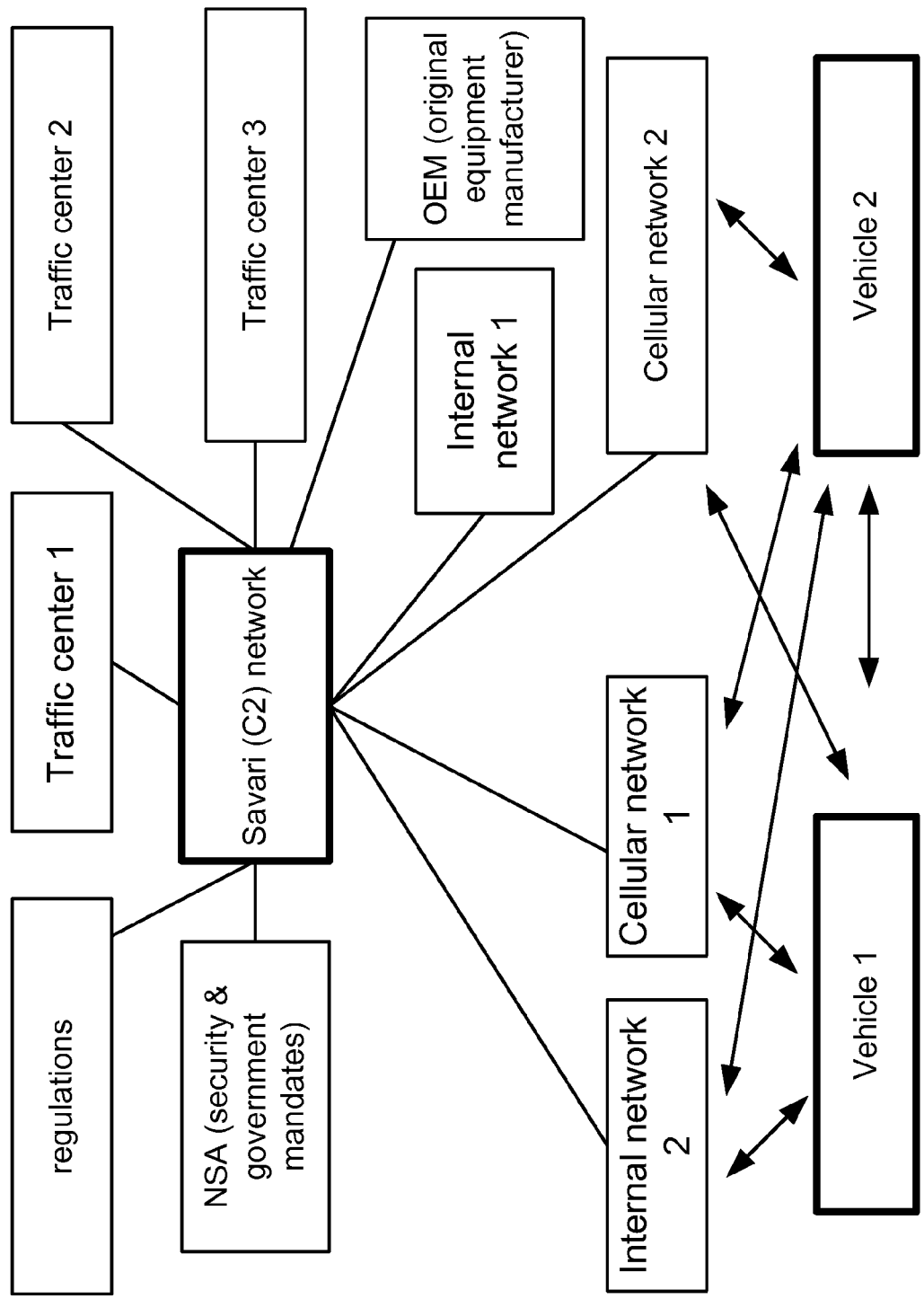
FIG. 9 is for one embodiment of the invention, for a system for our (Savari) C2 network, with components, showing communications between networks and vehicles.

FIG. 8 is for one embodiment of the invention, for a system for automated vehicle command and control (C2) cloud, with components, with various groups and people involved, as user, beneficiary, or administrator. FIG. 9 is for one embodiment of the invention, for a system for our (Savari) C2network, with components, showing communications between networks and vehicles, using traffic centers' data and regulations by different government agencies.

In one embodiment, we have the following technical components for the system: vehicle, roadway, communications, architecture, cybersecurity, safety reliability, human factors, and operations. In one embodiment, we have the following non-technical analysis for the system: public policy, market evolution, legal/liability, consumer acceptance, cost-benefit analysis, human factors, certification, and licensing.

In one embodiment, we have the following requirements for AV (automated vehicles) system:
　Secure reliable connection to the command and control center
　Built-in fail-safe mechanisms
　Knowledge of its position and map database information (micro and macro maps)
　Communication with traffic lights/road side infrastructure
　Fast, reliable, and secure
　Situational awareness to completely understand its immediate surrounding environment
　Requires multiple sensors
　Algorithms to analyze information from sensors
　Algorithms to control the car, for drive-by-wire capability In one embodiment, we have the following primary technologies for our system:
　V2X communication: time-critical and reliable, secure, cheap, and dedicated wireless spectrum
　Car OBE (on-board equipment): sensor integration (vision, radar and ADAS (advanced driver assistance system)), positioning (accurate position, path, local map), wireless module (physical layer (PHY), Media Access Control (MAC), antenna), security (multi-layer architecture), processing and message engine, and algorithms for vehicle prediction and control In one embodiment, we have the following building blocks for AVs:
　Automation Platform
　　i. Advanced Driver Assistance (ADAS) integration
　　ii. Map Integration, Lane Control
　　iii. Radio communications support
　　iv. Vehicle Controller Unit to do actuation Base Station
  Ground positioning support to improve positioning accuracy
  V2I (vehicle to infrastructure) functionality, support for public/private spectrums
  Cloud connectivity to provide secure access to vehicles
  Command Control Center
    i. Integration with Infrastructure Providers Here are some of the modules, components, or objects used or monitored
  in our system: V2V (vehicle to vehicle), GPS (Global Positioning System), V2I (vehicle to infrastructure), HV (host vehicle), RV (remote vehicle, other vehicle, or $3^{rd}$ party), and active and passive safety controls.

Figure 10:
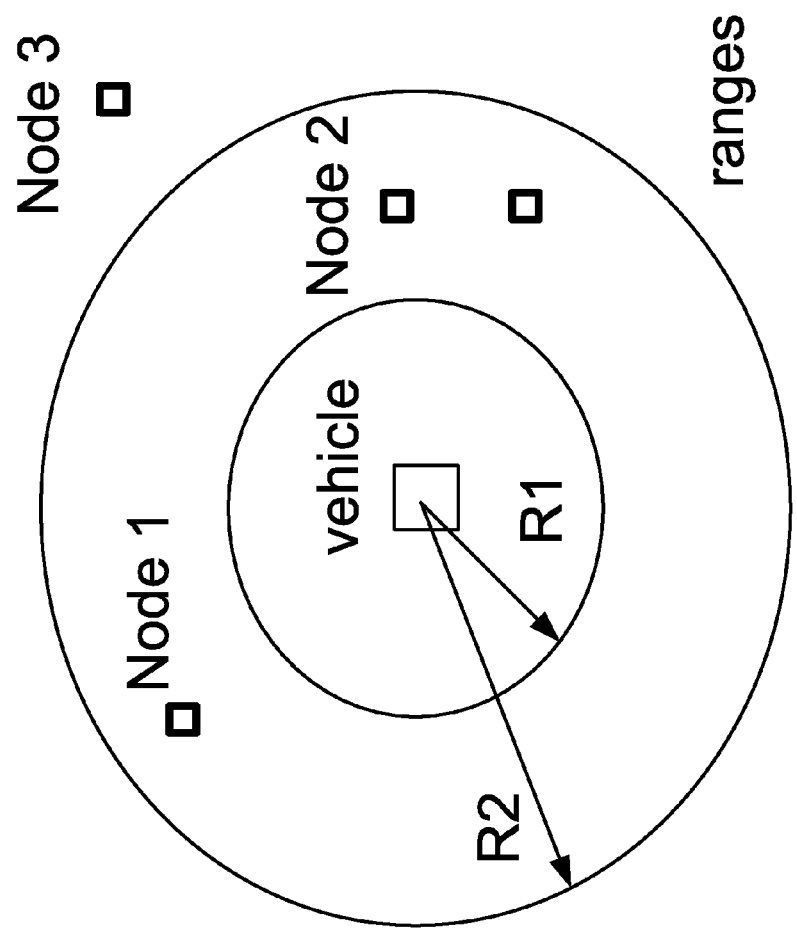
FIG. 10 is for one embodiment of the invention, for a system for host vehicle, range of R values, region(s) defined, multiple nodes or vehicles inside and outside region(s), for communications between networks and vehicles, and warning decisions or filtering purposes.
Figure 11:
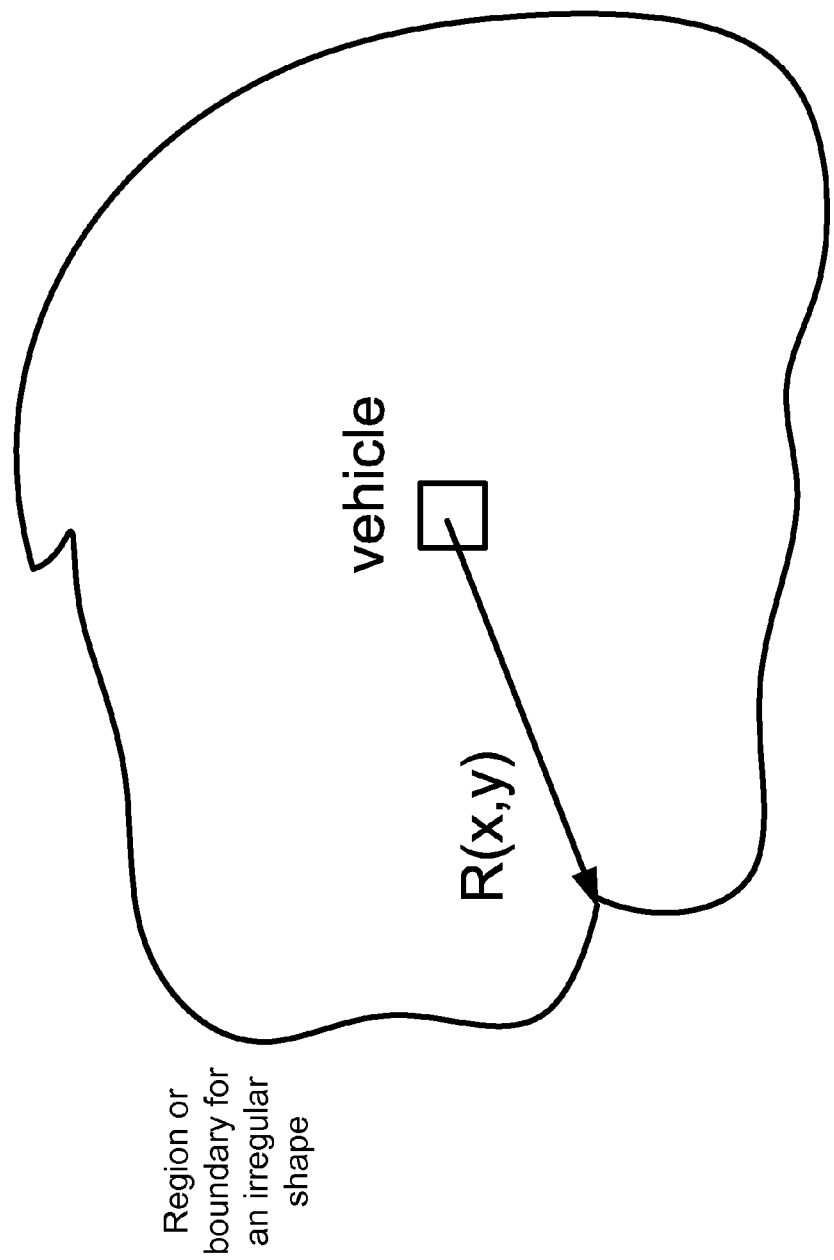
FIG. 11 is for one embodiment of the invention, for a system for host vehicle, range of R values, region(s) defined, for an irregular shape(s), depending on (x,y) coordinates in 2D (dimensional) coordinates, defining the boundaries.

FIG. 10 is for one embodiment of the invention, for a system for host vehicle, range of R values, region(s) defined, multiple nodes or vehicles inside and outside region(s), for communications between networks and vehicles, and warning decisions or filtering purposes, for various filters to reduce computations and reduce the bandwidth needed to handle the message traffic. FIG. 11 is for one embodiment of the invention, for a system for host vehicle, range of R values, region(s) defined, for an irregular shape(s), depending on (x,y) coordinates in 2D (dimensional) coordinates, defining the boundaries, or in 3D for crossing highways in different heights, if connecting.

Figure 12:
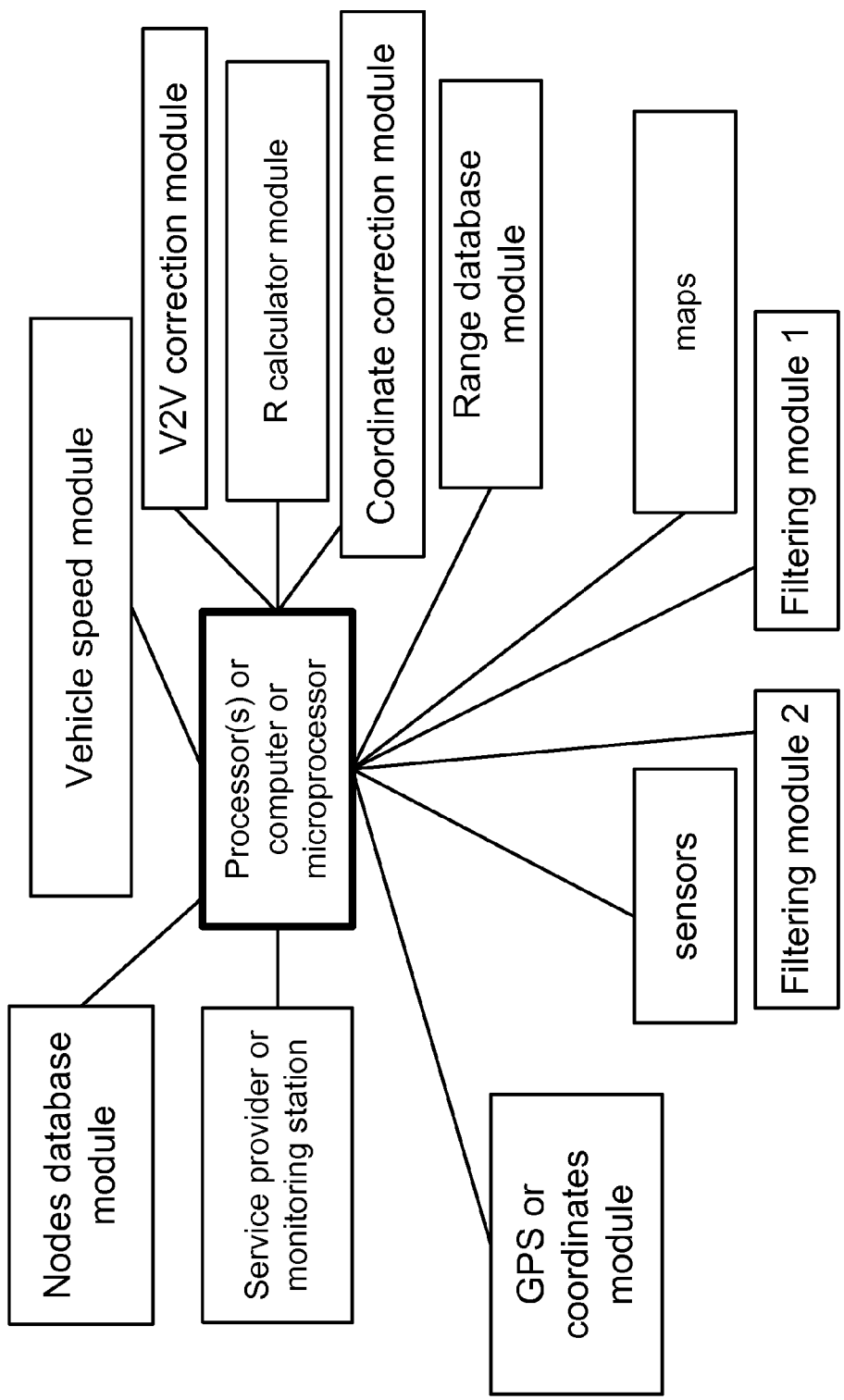
FIG. 12 is for one embodiment of the invention, for a system for automated vehicles, with components, with one or more filtering modules.
Figure 13:
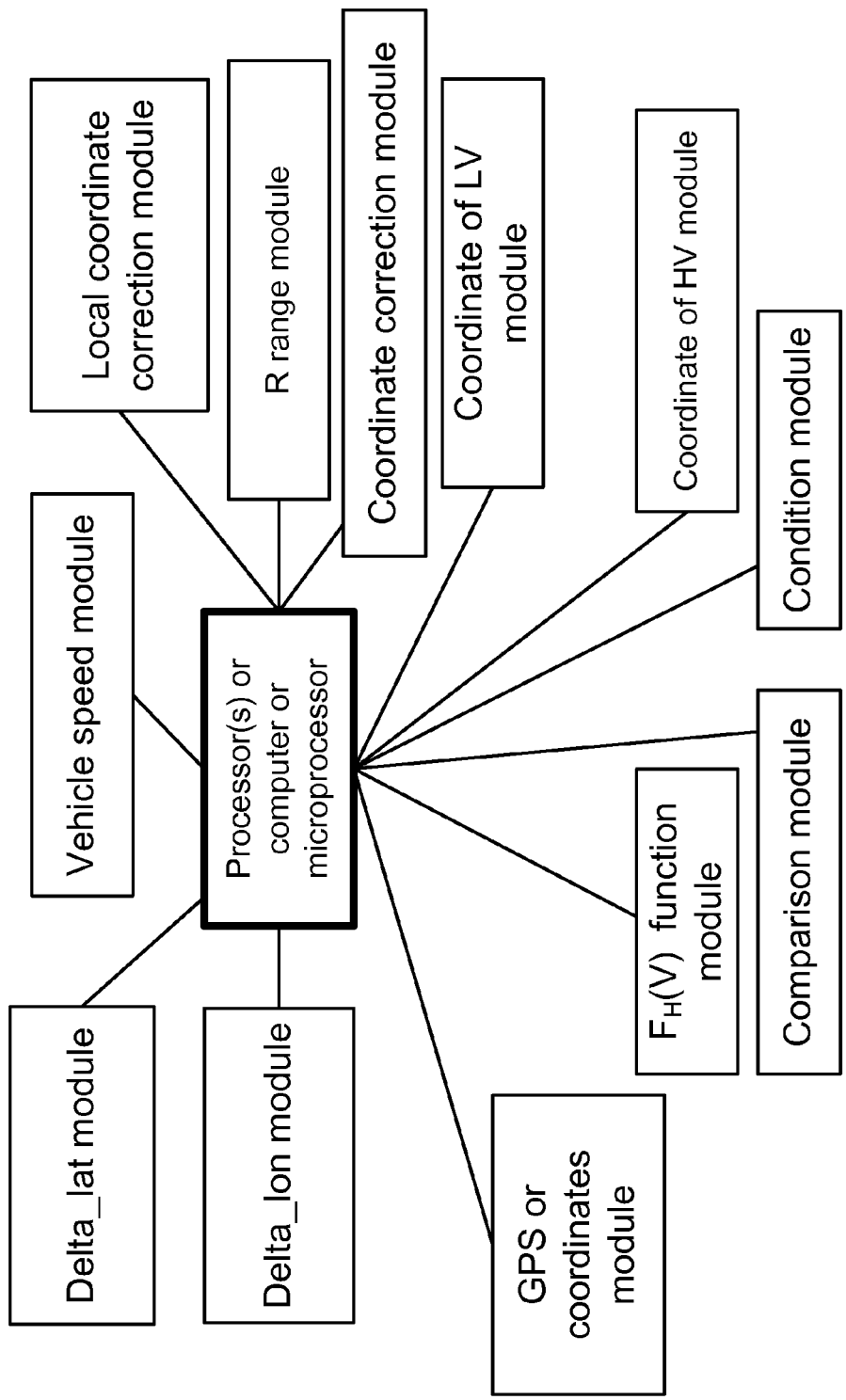
FIG. 13 is for one embodiment of the invention, for a system for automated vehicles, with components, with a function F( ), e.g., depending on the velocity of the vehicle, for calculations for Lat and Lon coordinates, and their corresponding deltas or differences.

FIG. 12 is for one embodiment of the invention, for a system for automated vehicles, with components, with one or more filtering modules, based on coordinates, Rs, GPS, and maps, and their corresponding corrections. FIG. 13 is for one embodiment of the invention, for a system for automated vehicles, with components, with a function F( ), e.g., depending on the velocity of the vehicle, for calculations for Lat and Lon coordinates, and their corresponding deltas or differences, with local and global coordinate correction module(s).

Figure 14:
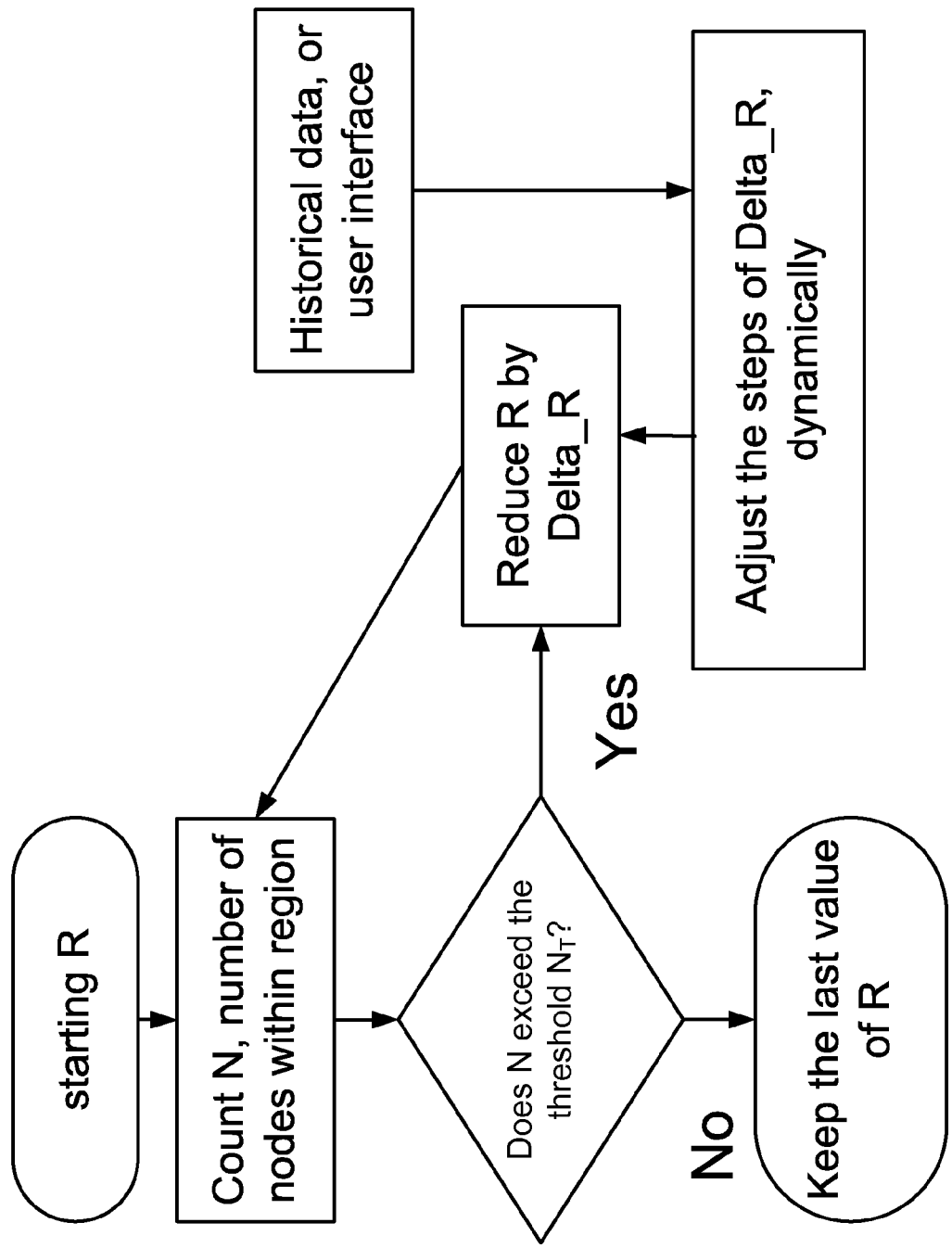
FIG. 14 is for one embodiment of the invention, for a method for automated vehicles, for adjusting R dynamically, based on rules engine, historical data, user-interface, or neural network.
Figure 15:
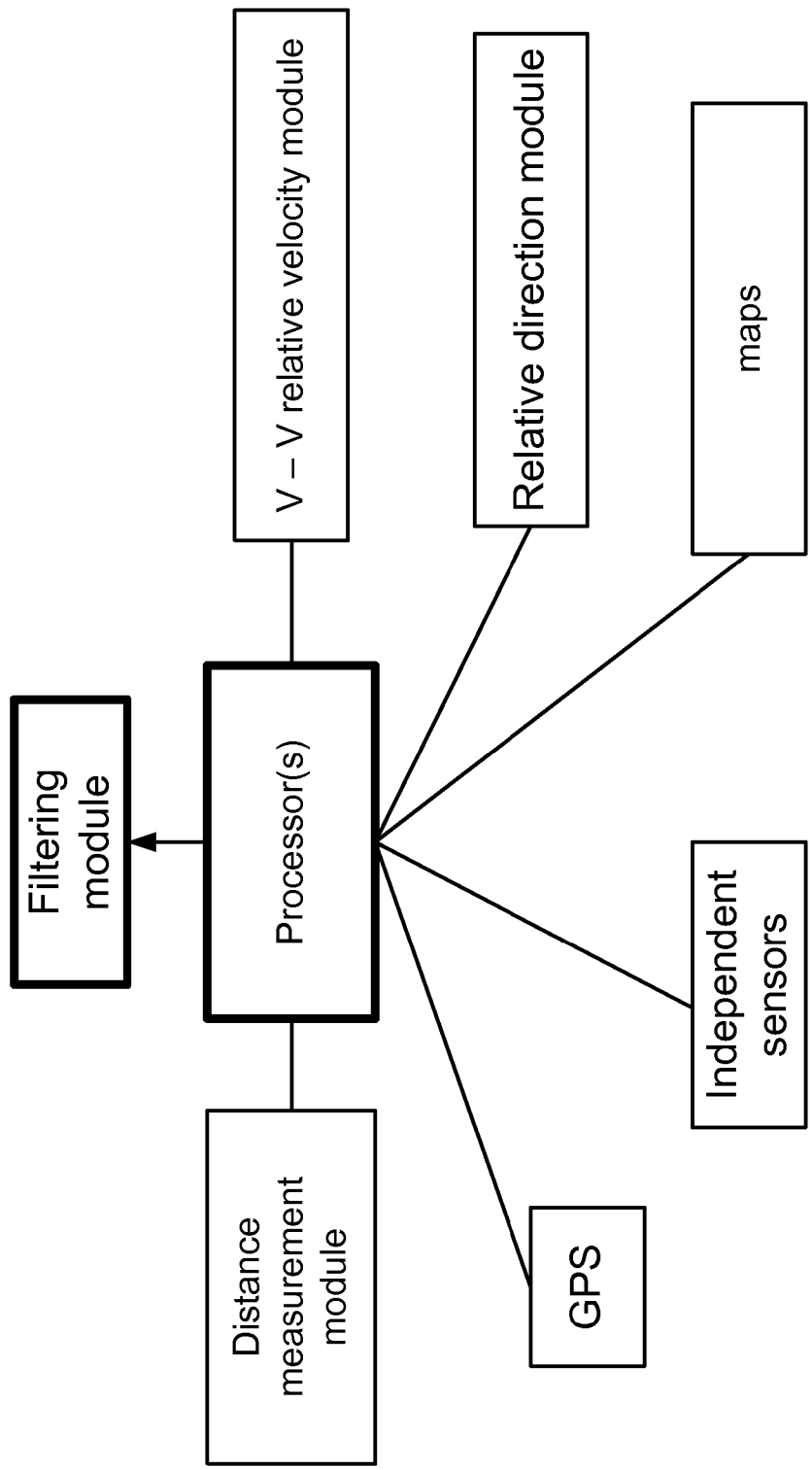
FIG. 15 is for one embodiment of the invention, for a system for automated vehicles, for filtering module, for direction, velocity, and distance.

FIG. 14 is for one embodiment of the invention, for a method for automated vehicles, for adjusting R dynamically, based on rules engine, historical data, user-interface, or neural network, e.g., for filtering purpose. FIG. 15 is for one embodiment of the invention, for a system for automated vehicles, for filtering module, for direction, velocity, and distance, e.g., using independent sensors and GPS.

Figure 16:
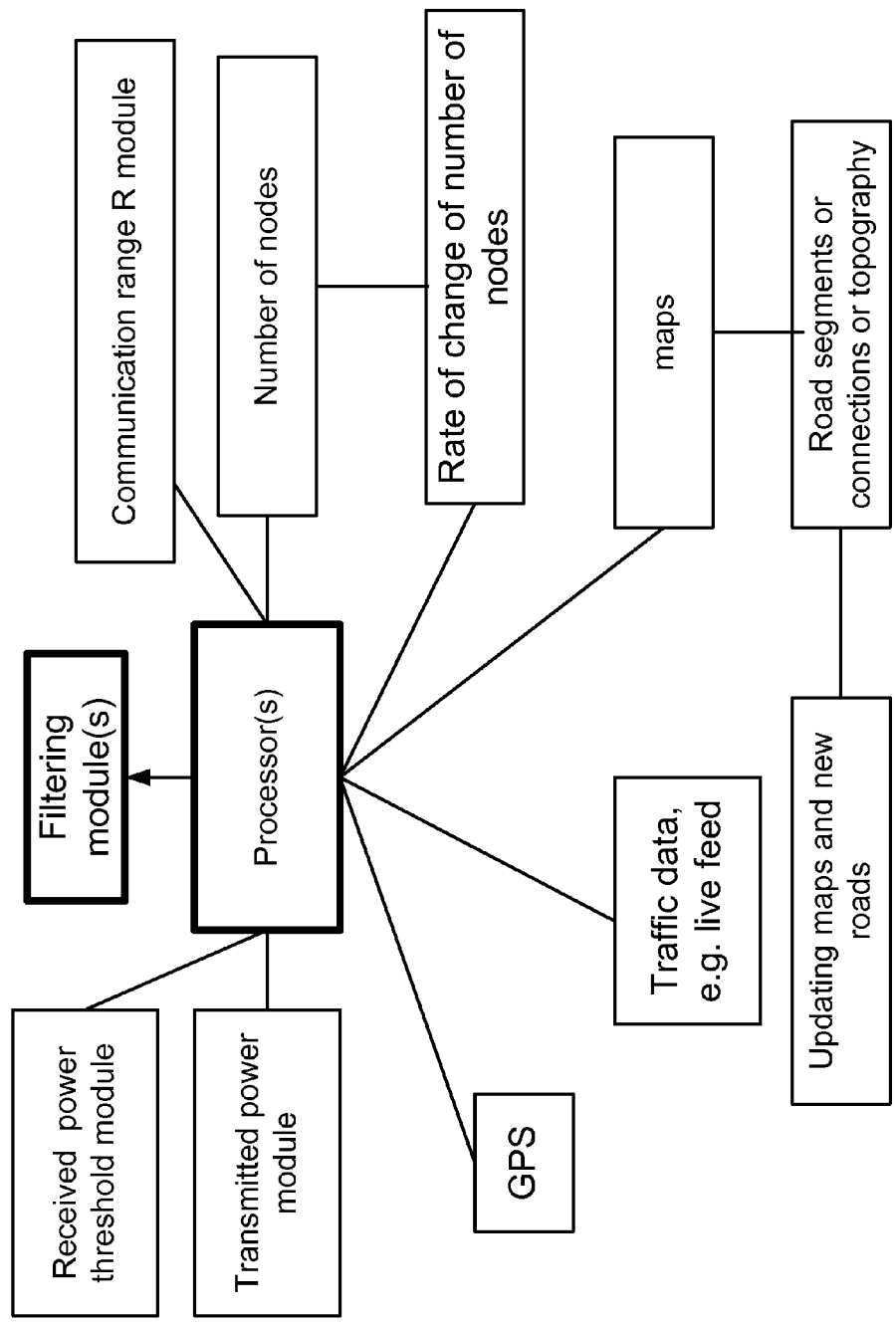
FIG. 16 is for one embodiment of the invention, for a system for automated vehicles, for filtering module, for power, power threshold(s), traffic data, maps, topography, R, number of nodes, and rate of change of number of nodes.

FIG. 16 is for one embodiment of the invention, for a system for automated vehicles, for filtering module, for power, power threshold(s), traffic data, maps, topography, R, number of nodes, and rate of change of number of nodes, with a module for updating the new roads, intersections, and topographies, by user or automatically, as a feed, e.g. periodically or based on an event.

Figure 17:
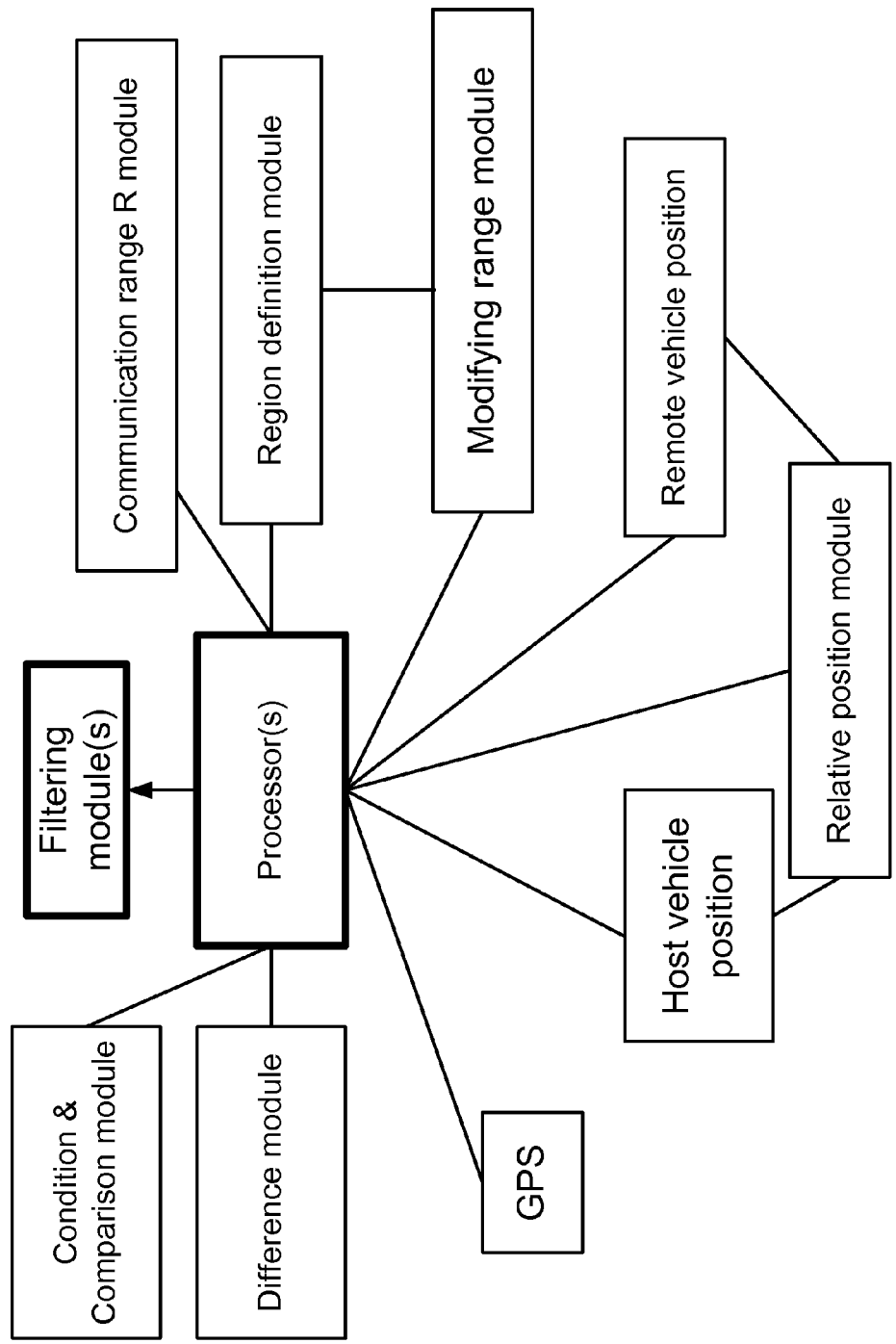
FIG. 17 is for one embodiment of the invention, for a system for automated vehicles, for filtering module, for various vehicles.

FIG. 17 is for one embodiment of the invention, for a system for automated vehicles, for filtering module, for modifying region, for various vehicles, with relative position module and GPS, with condition module, to compare and get all the relevant nodes or vehicles.

Here, we describe a method, as one embodiment: The first level of filtering is based on defining circle (geometry) of interest or any other geometrical shape (see also FIG. 11). For the circular geometry case, the objective is to ignore (not process) all nodes (vehicles) that is outside a calculated radius R (see also FIG. 10). In one embodiment, the R is calculated based on the targeted safety applications combined with vehicle dynamics. For example, FCW (forward collision warning), BSW (blind spot warning), LCA (lane change assist), IMA (intersection movement assist), and CSW can all be implemented using 200 m (meter) radius. In one embodiment, as the vehicle speed decreases, the forward application required coverage range decreases.

In one embodiment, for example, for calculating R, we have (see also FIG. 13):
  R, as a function of host vehicle speed, $F_H$, e.g.:

$$R = F_H(V) = 50 + 2V + (V^2/8)$$

Where V is the host vehicle speed in m/s.

In one embodiment, F is a function of velocities, distances, and coordinates, both in absolute values and relative values, for host and other vehicles. In one embodiment, F is a function of polynomial of degree G, in host vehicle speed V. In the example above, we have: G=2.

For example, for: 70 m≤R≤200m
That is, Maximum (R)=200m, and
Minimum (R)=70 m.

The 70 meter will still be sufficient to do all the rear applications. These numbers are just examples for some specific applications.

In one embodiment, the next step is to convert this R to delta Longitudinal and delta Latitude from the host vehicle coordinate. The objective here is to ignore all vehicles that are outside a radius. Here, we assumed circular filtering. Different types of geometric filtering can also be done: rectangle, ellipse, other irregular geometry, or any other regions or shapes. For circular filtering, given the current host vehicle (HV) coordinate (lat_HV, lon_HV), and given the desired filtering radius R, then the equivalent delta latitude (Delta_lat) and delta longitudinal (Delta_lon), from (lat_HV, lon_HV) for this radius R, are calculated as follows (see also FIG. 13):

Delta_lat=(R/Radius of earth)=(R/6378137), e.g., based on Earth Equatorial radius of 6378137 m,
  and where R is in meter (m).
Delta_lon=arcsin (sin(Delta_lat)/cos(lat_HV))

Therefore, in one embodiment, to apply the filtering algorithm for any node (Remote Vehicle (RV)), with the coordinate of (lat_RV, ion_RV), the following is executed (see also FIG. 13, for Comparison Module and Condition Module):
  If Abs(lat_RV−lat_HV)>Delta_lat

OR

Abs(lon_RV−lon_HV)>Delta_lon

Then: Ignore it (i.e., do not process it).
  Else: Process it.

Wherein all "lat" and "lon" values are expressed in radian. The default value for R is 200 m, but it is configurable. For jam reduction and reduction of processing, in one embodiment, we want to ignore all the vehicles outside of the radius R.

Now, in one embodiment, this value of R can be adaptively adjusted based on the statistical distribution of the nodes ranges (see also FIG. 12). For example, if the maximum number of nodes that can be processed is 150, and the calculated R=200m, and the number of nodes in the 200m radius is 200 nodes, but most of those nodes are close to the 200m range, then the R value can be adaptively adjusted (reduced), so we get close to the 150 desired total numbers of nodes. For example, this can be done in small steps with ΔR, in a loop, reducing the value of R slightly, each time (in each step), and measuring the nodes or vehicles within the new radius, and the process continues, until we get 150 nodes or less in that radius, and then we exit the loop, and stop the process (see also FIG. 14). Then, we select the final radius as the radius for the formulation and next steps.

In one embodiment, the second level of filtering is based on the relative velocity between the host vehicle and the remote vehicle. For example, for all remote vehicles that have a value of the velocity component in host vehicle direction that is greater than the host vehicle velocity, and they are also at relatively high range distance from the host vehicle, then they constitute no immediate threat on the host vehicle (based on the probability) (see also FIG. 15). Thus, those vehicles can be filtered out.

In one embodiment, the third level of filtering is to adjust either the transmitted power and/or the received power threshold as a function of one of the following (as different embodiments) (see also FIG. 16):

a. Rate of change in the number of received nodes. As the number of nodes increases sharply, the host vehicle is approaching a congested traffic area, and therefore, the transmitted power can be decreased to reduce the communication range, and/or the received power threshold can be increased to reduce the receiving communication range (see also FIG. 16).

b. The map database can also be used very effectively: For example, if the number of connected road segments to the host vehicle road segment is high, and/or the total number of road segments is high within a defined area, then the transmitted power can be decreased, and/or the received power threshold can be increased (see also FIG. 16).

c. Based on the calculated R. For example, communication range R decreases/increases, as the transmission power increases/decreases (see also FIG. 16).

In one embodiment, the fourth level of filtering is just using the map database: For example, filter all the nodes (vehicles) that are on road segments that are not connected to the host vehicle road segment. An example for that is the main road and an overpass geometry. The main road and the overpass that passes over it are not connected, and thus, they do not make a V2V (vehicle to vehicle) possible traffic hazard. Map database can provide this information that these two road segments are not connected (see also FIG. 16).

The advantages of our methods are very clear over what the current state-of-the-art is. Our methods optimally use the available processing power and available bandwidth on processing the data of the desired nodes, which are relevant or important. They also help reducing the communication congestion problem.

Please note that the attached Appendices (in this application and its parent cases) are also parts of our teaching here, with some of the technologies mentioned there developed fully within our company, and some with prototypes, for which we seek patent protection in this and future/co-pending divisionals or related cases or continuations.

In this disclosure, any computing device, such as processor, microprocessor(s), computer, PC, pad, laptop, server, server farm, multi-cores, telephone, mobile device, smart glass, smart phone, computing system, tablet, or PDA can be used. The communication can be done by or using sound, laser, optical, magnetic, electromagnetic, wireless, wired, antenna, pulsed, encrypted, encoded, or combination of the above. The vehicles can be car, sedan, truck, bus, pickup truck, SUV, tractor, agricultural machinery, entertainment vehicles, motorcycle, bike, bicycle, hybrid, or the like. The roads can be one-lane county road, divided highway, boulevard, multi-lane road, one-way road, two-way road, or city street. Any variations of the above teachings are also intended to be covered by this patent application.

The invention claimed is:

1. A method for creating, storing, and updating local dynamic map database with safety attribute, for a street or highway, said method comprising:

a central computer obtaining basic safety messages in an intended region of map, wherein the basic safety messages include vehicle data;

filtering out a first basic safety message data out of said basic safety messages which falls outside of said intended region of map;

adaptively defining said intended region of map, using speed profiles data in each road segment of interest;
   wherein a high average speed road segment requires greater map coverage than a low average speed road segment;

receiving path history or trajectory from an at least one vehicle;

checking accuracy of said path history or trajectory;

when said accuracy of said path history or trajectory is better than a first accuracy threshold distance, storing said path history or trajectory, instead of actual locations reported by said at least one vehicle;

when said accuracy of said path history or trajectory is worse than said first accuracy threshold distance, storing said actual locations reported by said at least one vehicle;

storing a location, heading, speed, and timestamp of each of said basic safety messages received; and when corresponding number of vehicles for stored data is above a first number of vehicle threshold, then starting generation of a temporary map;

said central computer further:

generating lanes, wherein generating lanes includes:
   assigning equal weights for all paths at beginning, as an initialization step;
   combining paths or parts of paths which have a separation distance of smaller than a threshold fraction of a lane width, to produce a resultant path, to indicate that said paths or parts of paths are actually the same;
   wherein weight of said resultant path is calculated using the equation:

$$(1/\mathrm{sqrt}(((1/w1)^2 *(1/w2)^2)/((1/w1)^2+(1/w2)^2)))$$

wherein sqrt is the square root function, w1 is weight of a first path, and w2 is weight of a second path;
   combining paths which start and end with same heading angles;
   combining parts of paths of vehicles which have same headings in said parts;
   updating weights of the paths or parts of the paths of combined paths which are headed in same direction, using the equation:

$$(1/\mathrm{sqrt}(((1/w1)^2 *(1/w2)^2)/((1/w1)^2+(1/w2)^2)))$$

detecting lane changes in captured data, wherein detecting lane changes includes using statistical median operation to filter outliers in positions and paths for lane change detection;

determining an intersection region and splitting lanes wherein determining an intersection region and splitting lanes includes:
   identifying an intersection diamond region using speed profiles of vehicles, heading angles of said vehicles, and intersection of lanes, generated from said vehicles' travel paths;
   obtaining intersection of lanes, generated from said vehicles' travel paths;

constructing intersection points of lanes for each of lanes which differ in heading angle by more than a threshold angle value;

constructing a convex polygon using said intersection points of lanes;

expanding a convex polygon by adding a certain amount of width, equal to a specific fraction of lane width on each of sides;

splitting lanes, based on intersection region polygon;

determining lane type as ingress or egress, wherein determining lane type includes determining a difference in angle between vehicle heading and lane heading;

combining incoming and outgoing lanes which fall on one side of said polygon and have either same or exactly opposite heading angle, with difference of approximately 180 degrees;

determining connected lanes;

determining movement states for each of said ingress lanes based on connected egress lane's maneuver code, wherein connection maneuvers comprise: left-turn, straight, or right-turn;

updating said map data;

generating lanes for said street or highway.

2. The method for creating, storing, and updating local dynamic map database with safety attribute, for a street or highway, as recited in claim 1, said method further comprises:

identifying an idle vehicle, impeding traffic situation, or accident in said street or highway.

3. The method for creating, storing, and updating local dynamic map database with safety attribute, for a street or highway, as recited in claim 1, said method further comprises:

using a short range communication device with a roadside equipment in infrastructure and an on-board unit in a first vehicle.

4. The method for creating, storing, and updating local dynamic map database with safety attribute, for a street or highway, as recited in claim 1, said method further comprises:

storing a time-stamp for a basic safety message.

* * * * *